(12) United States Patent
Kim et al.

(10) Patent No.: US 12,334,552 B2
(45) Date of Patent: Jun. 17, 2025

(54) POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(71) Applicant: Dong-A University Research Foundation For Industry-Academy Cooperation, Busan (KR)

(72) Inventors: Jeom-Soo Kim, Hwaseong-si (KR); Byeong Cheol Min, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 602 days.

(21) Appl. No.: 16/865,589

(22) Filed: May 4, 2020

(65) Prior Publication Data
US 2020/0350581 A1     Nov. 5, 2020

(30) Foreign Application Priority Data

May 2, 2019     (KR) ........................ 10-2019-0051867

(51) Int. Cl.
*H01M 4/525*     (2010.01)
*C01G 53/50*     (2025.01)
(Continued)

(52) U.S. Cl.
CPC ............ *H01M 4/525* (2013.01); *C01G 53/50* (2013.01); *H01M 4/0471* (2013.01);
(Continued)

(58) Field of Classification Search
None
See application file for complete search history.

(56) References Cited

U.S. PATENT DOCUMENTS

2018/0108940 A1\*    4/2018   Kwon ................... C01G 53/50
2018/0151876 A1\*    5/2018   Kim ....................... H01M 4/485

FOREIGN PATENT DOCUMENTS

KR    10-2005-0083869    8/2005
KR    10-2008-0066908    7/2008
(Continued)

OTHER PUBLICATIONS

Byeong Cheol Min et al., "Multi-Textured Active Material for Enhancing Charging Property of Lithium-Ion Batteries", 2018 KSIEC Spring Meeting, May 2-4, 2018, EXCO, Daegu, Republic of Korea. (academic conference).

(Continued)

*Primary Examiner* — Wyatt P McConnell
(74) *Attorney, Agent, or Firm* — LEX IP MEISTER, PLLC

(57) ABSTRACT

Disclosed is a positive active material for a rechargeable lithium battery including secondary particles of a nickel-based transition metal oxide composed of an inner portion and an outer portion, wherein the inner portion has a dense structure having a higher density than the outer portion, the secondary particles of the nickel-based transition metal oxide have a plurality of protruding portions on the surface thereof, and the positive active material has an area ratio of 25% to 30% occupied by the protruding portions calculated by Equation 1 based on a cross-section of the secondary particles of the nickel-based transition metal oxide.

16 Claims, 25 Drawing Sheets

(51) Int. Cl.
- *H01M 4/04* (2006.01)
- *H01M 4/131* (2010.01)
- *H01M 4/1391* (2010.01)
- *H01M 4/36* (2006.01)
- *H01M 10/0525* (2010.01)
- *H01M 4/02* (2006.01)

(52) U.S. Cl.
CPC ......... *H01M 4/131* (2013.01); *H01M 4/1391* (2013.01); *H01M 4/366* (2013.01); *H01M 10/0525* (2013.01); *C01P 2002/85* (2013.01); *C01P 2004/03* (2013.01); *H01M 2004/021* (2013.01); *H01M 2004/028* (2013.01); *Y02E 60/10* (2013.01)

(56) References Cited

FOREIGN PATENT DOCUMENTS

| KR | 10-2013-0138147 | 12/2013 |
| KR | 10-2015-0026801 | 3/2015 |
| KR | 10-2016-0052428 | 5/2016 |
| KR | 10-2016-0129764 | 11/2016 |
| KR | 10-2018-0062429 | 6/2018 |
| KR | 10-2018-0063860 | 12/2018 |

OTHER PUBLICATIONS

Byeong Cheol Min et al., "Influence of precursor structures and synthesis conditions to the electrochemical performance of MTSC", 2018 Autumn General Assembly and Academic Conference (International Symposium)—Interdisciplinary Chemical Engineering, Oct. 24-26, 2018, EXCO, Daegu, Republic of Korea. (academic conference).

Byeong Cheol Min et al., "Fast charge characteristics of NCM cathode materials having difference morphologies", 2018 The Korean Electrochemical Society—General Meeting of the Autumn Announcement and Academic Presentation, Nov. 1-3, 2018, EXPO, Yeosu, Republic of Korea. (academic conference).

* cited by examiner (a) Example 1 – positive active material precursor (b) Comparative Example 2 – positive active material precursor (a) Example 1 – positive active material (b) Comparative Example 2 – positive active material (a) Example 1 – positive active material (b) Comparative Example 1 – positive active material

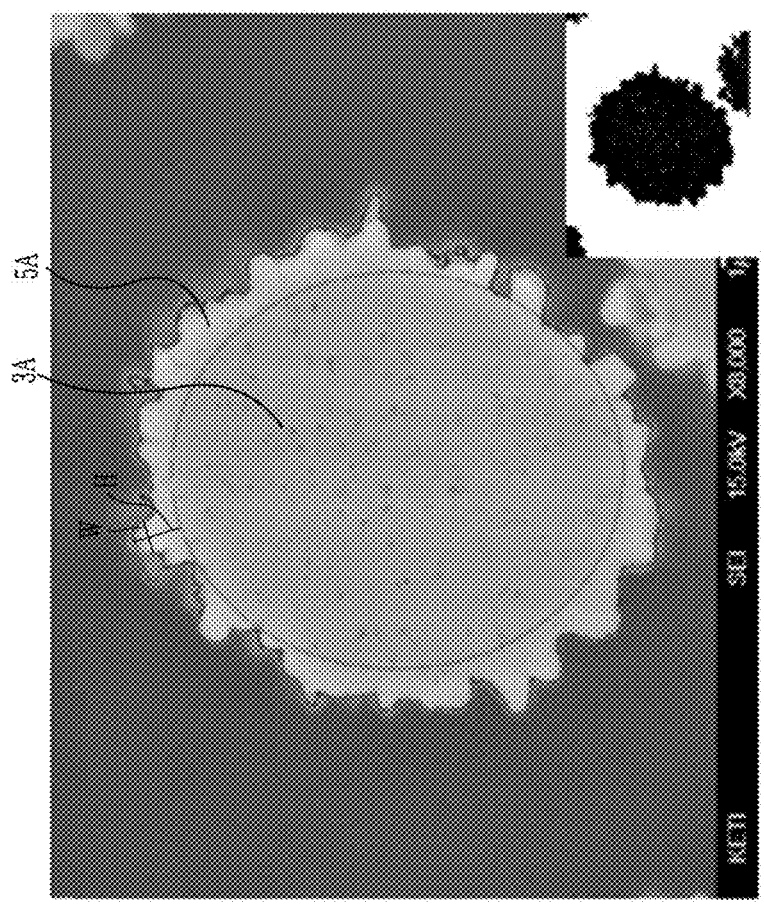

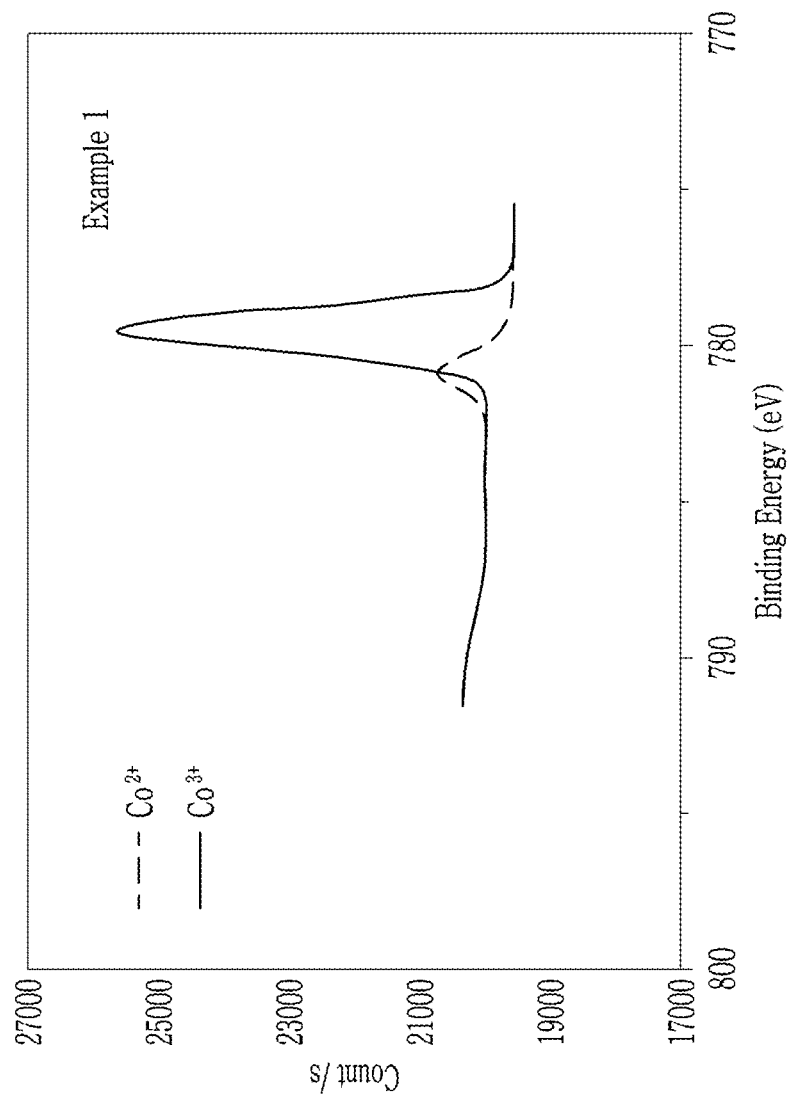

(a) Example 1

(b) Comparative Example 1

POSITIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2019-0051867 filed in the Korean Intellectual Property Office on May 2, 2019, the entire contents of which are incorporated herein by reference.

BACKGROUND OF THE INVENTION

(a) Field of the Invention

A positive active material for a rechargeable lithium battery, a method of preparing the same, and a rechargeable lithium battery including the same are disclosed.

(b) Description of the Related Art

As demand for portable electronics such as laptops, cellphones, and the like is sharply increased, and as demand for electric carts, electric wheelchairs, electric motorbikes, and the like is also increased, research on a repeatedly chargeable/dischargeable high performance rechargeable battery is actively being undertaken.

In addition, as gradual depletion of carbon energy and interest in environmental conservation are increased, demands for hybrid electric vehicles (HEV) and electric vehicles (EV) are being gradually increased around the world. Accordingly, as more interest and research on a vehicle battery as a core part of an HEV or EV is concentrated, high-rate charging technology for quickly charging a battery needs to be urgently developed. Particularly, the high-rate charging is very important in an EV having no additional energy source.

A battery charge process includes inputting a current to a battery and storing energy therein. Since an excessive charge rate (C-rate) or charge voltage generally deteriorates battery performance and ultimately causes complete battery failure or an unexpected disorder such as leakage of very corrosive chemicals, explosion, or the like, the charge process should be precisely controlled.

A rechargeable lithium battery, as the name suggests, uses lithium, and has a merit of high energy density and light weight but has a drawback of easily forming dendrites and thus becoming dangerous. Specifically, during the charge, electricity is stored through a process in which lithium ions exit a positive electrode and enter a negative electrode. During this process, the Li ions exiting the positive electrode during the initial charge, passing through an electrolyte solution, and entering the negative electrode go through a polarization phenomenon at the interface of each material, which leads to an overvoltage. Herein, when an amount of moving ions is smaller than an amount of a flowing current, the lithium ions are precipitated due to the overvoltage. The lithium precipitation may also be caused by electrical resistance as well as the movement of the lithium ions, and the movement of the ions is closely related to porosity of an electrode and the like.

Since higher porosity increases mobility of the lithium ions but decreases an electrical contact surface, the porosity needs to be appropriately controlled, but is very difficult to do so. In particular, the higher porosity has another problem of naturally lowering energy density.

SUMMARY OF THE INVENTION

In order to solve the above problems, an embodiment provides a positive active material exhibiting high energy density while having high lithium ion permeability to an inner portion of particles thereof.

Another embodiment provides a positive active material precursor for preparing the positive active material.

Another embodiment provides a method of preparing the positive active material.

Another embodiment provides a rechargeable lithium battery including the positive active material.

An embodiment provides a positive active material for a rechargeable lithium battery including secondary particles of a nickel-based transition metal oxide composed of an inner portion and an outer portion, wherein the inner portion has a dense structure having a higher density than the outer portion, the secondary particles of the nickel-based transition metal oxide have a plurality of protruding portions on the surface thereof, and the positive active material has an area ratio of 25% to 30% occupied by protruding portions calculated by Equation 1 based on a cross-section of the secondary particles of the nickel-based transition metal oxide.

$$[A_t - A_i]/A_t \qquad \text{[Equation 1]}$$

In Equation 1, $A_t$ is a total area of the secondary particle of the nickel-based transition metal oxide, and $A_i$ is an area of an inner circle with a radius from the inner end of the vertically oriented primary particle constituting the protruding portions to the center of the secondary particle of the nickel-based transition metal oxide.

When a length of a narrowest portion in the protruding portion is a width (W) and a length from the outer end portion of the protruding portion to the inner circle is a height (H), an aspect ratio (H/W) may be 1.4 to 2.8.

When a length of the narrowest portion of the protruding portion is a width (W) and a length from the outer end portion of the protruding portion to the inner circle is a height (H), the width (W) may be 0.25 μm to 0.60 μm and the height (H) may be 0.65 μm to 1.00 μm.

The primary particles constituting the protruding portion may have a concentration gradient in which a fraction of cobalt (Co) decreases from the outer end portion to the inner end portion.

When in the primary particles constituting the protruding portion, a region from 20% of the major axis or minor axis of the primary particle from the outer end portion of the primary particle to 40% of the major axis or minor axis of the primary particle from the outer end portion of the primary particle is referred to as an outer region and a region from 20% of the major axis or minor axis from the inner end portion of the primary particle to 40% of the major axis or minor axis from the inner end portion of the primary particle is referred to as an inner region, the fraction of cobalt in the outer region may range from 27 at % to 30 at % relative to 100 at % of transition metals and the fraction of cobalt in the inner region may range from 12 at % to 23 at % relative to 100 at % of transition metals.

The ratio ($F_2/F_1$) of the fraction ($F_2$) of the cobalt in the inner region to the fraction ($F_1$) of the cobalt in the outer region may be in the range of 0.60 to 0.90.

The secondary particles of the nickel-based transition metal oxide may have an average particle diameter (D50) of 8 μm to 11 μm, the inner portion may have a size (diameter) of 6 μm to 9 μm, and the outer portion may have a thickness of 0.5 μm to 1.0 μm.

When XPS analyzing the surface of the positive active material, a ratio ($A_{Ni3+}/A_{Ni2+}$) of a peak area ($A_{Ni3+}$) of $Ni^{3+}$ relative to a peak area ($A_{Ni2+}$) of $Ni^{2+}$ may be greater than or equal to 0.75.

When XPS analyzing the surface of the positive active material, a ratio ($A_{Co3+}/A_{Co2+}$) of a peak area ($A_{Co3+}$) of $Co^{3+}$ relative to a peak area ($A_{Co2+}$) of $Co^{2+}$ may be greater than or equal to 7.5.

When XPS analyzing the surface of the positive active material, a ratio ($A_{Mn3+}/A_{Mn4+}$) of a peak area ($A_{Mn3+}$) of $Mn^{3+}$ relative to a peak area ($A_{Mn4+}$) of $Mn^{4+}$ may be less than or equal to 0.10.

In the positive active material, a fraction of at least one transition metal based on 100 at % (atomic percent) of the transition metal may have a difference of greater than or equal to 20 at % between the inner portion and the outer portion.

The positive active material may have a composition in which a fraction of nickel of the inner portion based on 100 at % of the transition metal may be 50 at % or more higher than that of nickel of the outer portion based on 100 at % of the transition metal.

The positive active material may have a composition in which a fraction of cobalt of the outer portion based on 100 at % of the transition metal may be 30 at % or more higher than that of cobalt of the inner portion based on 100 at % of the transition metal.

The secondary particle of the nickel-based transition metal oxide may be a compound represented by Chemical Formula 1.

$$Li_aNi_xCo_yM_{1-x-y}O_2 \qquad \text{[Chemical Formula 1]}$$

In Chemical Formula 1,
0.9≤a≤1.05, 0.55≤x≤0.95, 0.05≤y≤0.35, and M is at least one metal element selected from Mn, Al, Cr, Fe, V, Mg, Ti, Zr, Nb, Mo, W, Cu, Zn, Ga, In, Sn, La, and Ce.

The positive active material may have a specific surface area of 0.3 m²/g to 0.6 m²/g.

Another embodiment provides a positive active material precursor for a rechargeable lithium battery including secondary particles of a nickel-based transition metal hydroxide composed of a core and a shell, wherein the core has a high fraction of nickel, the shell has a high fraction of cobalt, the core has a higher density than the shell, and the shell has a thickness of 1 μm to 2.5 μm.

A fraction of nickel in the core may be greater than or equal to 70 at % based on 100 at % of the transition metal, and a fraction of cobalt in the core may be less than or equal to 30 at % based on 100 at % of the transition metal.

A fraction of nickel in the shell may range from 10 at % to 40 at % based on 100 at % of the transition metal, and a fraction of cobalt in the shell may range from 50 at % to 70 at % based on 100 at % of the transition metal.

The secondary particle of nickel-based transition metal hydroxide may have an average particle diameter (D50) of 1 μm to 3 μm larger than that of the secondary particle of the nickel-based transition metal oxide.

Another embodiment provides a method of preparing a positive active material for a rechargeable lithium battery that includes: introducing a metal solution for forming a core including a transition metal compound represented by Chemical Formula 2, a chelating agent, and a precipitating agent into a reactor to prepare a precursor core by co-precipitation; adding a metal solution for forming a shell including a transition metal compound represented by Chemical Formula 3 to prepare a precursor shell on the precursor core by co-precipitation followed by filtering, washing, and drying the produced material to prepare the secondary particle of the nickel-based transition metal hydroxide according to the aforementioned embodiment; and mixing the secondary particle of the nickel-based transition metal hydroxide and a lithium salt to continuously perform a first heat treatment and a second heat treatment to prepare a secondary particle of the nickel-based transition metal oxide.

$$Ni_xCo_yM_{1-x-y}(SO)_4 \qquad \text{[Chemical Formula 2]}$$

In Chemical Formula 2,
0.70≤x, y≤0.30, and M is at least one metal element selected from Mn, Al, Cr, Fe, V, Mg, Ti, Zr, Nb, Mo, W, Cu, Zn, Ga, In, Sn, La, and Ce.

$$Ni_xCo_yM_{1-x-y}(SO)_4 \qquad \text{[Chemical Formula 3]}$$

In Chemical Formula 3,
0.05≤x≤0.45, 0.50≤y≤0.80, and M is at least one metal element selected from Mn, Al, Cr, Fe, V, Mg, Ti, Zr, Nb, Mo, W, Cu, Zn, Ga, In, Sn, La, and Ce.

The first heat treatment may be performed in an oxygen atmosphere including 99.0 volume % to 99.9 volume % of oxygen, at 450° C. to 550° C. for 5 hours to 10 hours, and the second heat treatment may be performed in an oxygen atmosphere including 99.0 volume % to 99.9 volume % of oxygen at 750° C. to 850° C. for 5 hours to 15 hours.

Another embodiment provides a rechargeable lithium battery including a positive electrode including the positive active material; a negative electrode, and an electrolyte.

The secondary particle of the nickel-based transition metal oxide may have improved structural stability to improve electrochemical characteristics such as cycle-life characteristics of a battery including the same.

Lithium ions may move from the surface to the inner portion of the secondary particles of the nickel-based transition metal oxide, and thereby a battery exhibiting an improved high-rate charging effect and capacity characteristics may be provided.

BRIEF DESCRIPTION OF THE DRAWINGS

FIG. 7A shows marks distinguishing an inner portion and an outer portion (including the protruding portion) in the cross-sectional SEM image of the positive active material according to Example 1.

FIGS. 9A to 9C are graphs showing a Ni oxidation number, a Co oxidation number, and a Mn oxidation number of the positive active material according to Example 1, respectively.

DETAILED DESCRIPTION OF THE EMBODIMENTS

Hereinafter, embodiments of the present invention are described in detail. However, these embodiments are exemplary, the present invention is not limited thereto and the present invention is defined by the scope of claims.

It will be understood that when an element such as a layer, film, region, or substrate is referred to as being "on" another element, it can be directly on the other element or intervening elements may also be present.

Hereinafter, a positive active material for a rechargeable lithium battery according to an embodiment is described with reference to FIG. 1.

Figure 1:
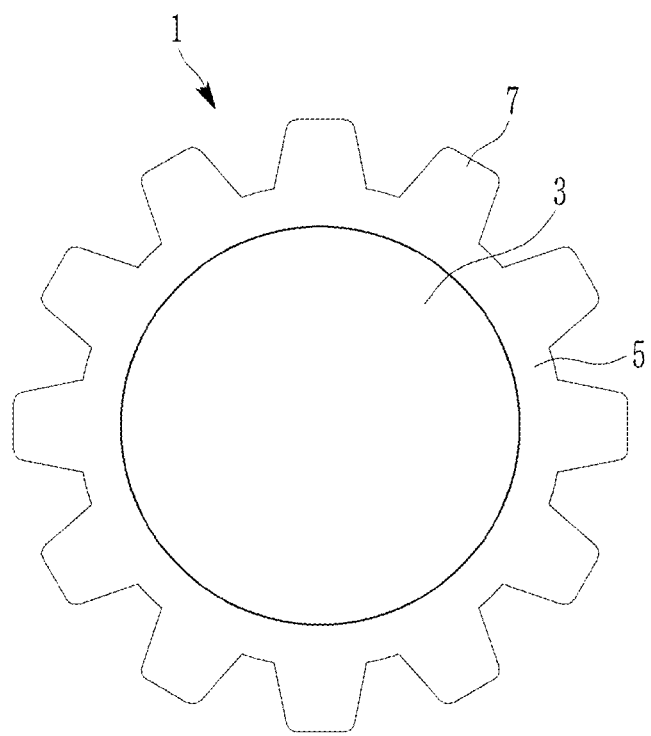
FIG. 1 is a schematic view of a secondary particle of the nickel-based transition metal oxide according to an embodiment.

FIG. 1 is a schematic view of a secondary particle of the nickel-based transition metal oxide according to an embodiment.

The positive active material for a rechargeable lithium battery according to an embodiment includes a secondary particle 1 of the nickel-based transition metal oxide, and the secondary particle 1 of the nickel-based transition metal oxide is composed of an inner portion 3 and an outer portion 5. The inner portion 3 has a dense structure with a higher density than the outer portion 5. The secondary particle 1 of the nickel-based transition metal oxide includes a plurality of protruding portions 7 at the surface thereof, and the positive active material has an area ratio of 25% to 30% occupied by the protruding portions 7 calculated by Equation 1 based on the cross-section of the secondary particle 1 of the nickel-based transition metal oxide.

$$[A_t - A_i]/A_t \qquad \text{[Equation 1]}$$

In Equation 1, $A_t$ is a total area of the secondary particle 1 of the nickel-based transition metal oxide, and $A_i$ is an area of an inner circle with a radius from the inner end portion of the vertically oriented primary particle constituting the protruding portions to the center of the secondary particle 1 of the nickel-based transition metal oxide.

The "vertically oriented primary particles" means that the (003) plane of plate-shaped primary particles is substantially vertically oriented with respect to the surface of the inner circle of the secondary particles. Also, the vertical direction means that the long axis or short axis is arranged at an angle of 70° to 110°, for example 80° to 100° with respect to the tangent at the point where the long axis (a axis) or short axis (b axis) of the (003) plane meets the surface of the inner circle of the secondary particle.

In an embodiment, the inner end portion of the vertically oriented primary particles constituting the protruding portion may mean the inner end portion closest to the center of the inner end portions of the plurality of primary particles disposed at the outermost side of the secondary particles.

When the secondary particle 1 of the nickel-based transition metal oxide has a dense structure in which the inner portion 3 has a higher density than the outer portion 5 and the area ratio occupied by the protruding portions calculated by Equation 1 is within the above range, a high-rate charging effect may be exhibited by rapidly moving lithium ions to the inner portion by a capillary action inside the secondary particles of the nickel-based transition metal oxide.

When a length of the narrowest portion of the protruding portion 7 is a width (W) and a length from the outer end portion of the protruding portion 7 to the inner circle is a height (H), an aspect ratio (H/W) may be 1.4 to 2.8, for example greater than or equal to 1.5, greater than or equal to 1.6, greater than or equal to 1.7, greater than or equal to 1.8, greater than or equal to 1.9, or greater than or equal to 2.0, and less than or equal to 2.7, for example less than or equal to 2.6, or less than or equal to 2.5. When the aspect ratio is within the above range, as described above, the inner portion of the secondary particles of the nickel-based transition metal oxide forms a dense structure having a higher density than the outer portion, thereby achieving diffusion and high-rate charging effects of lithium ions due to capillary action. In addition, when manufacturing an electrode by a compressing process, no damage to the plurality of protruding portions 7 occurs, and thus particle cracking of the positive active material may be suppressed.

Specifically, the width (W) of the protruding portions 7 may be 0.25 μm to 0.60 μm, for example 0.25 μm to 0.55 μm, or specifically 0.25 μm to 0.50 μm, and the height (H) may be 0.65 μm to 1.00 μm, for example 0.70 μm to 1.00 μm, or specifically 0.75 μm to 1.00 μm.

The area occupied by the protruding portions, the width, height, and aspect ratio of the protruding portions may be analyzed using a National Institutes of Health (ImageJ) program for cross-sectional SEM images of the active material particles.

The secondary particles of the nickel-based transition metal oxide may have an average particle diameter (D50) of 8 μm to 11 μm, for example, 8.5 μm to 10.5 μm. The inner portion may have a size (diameter) of 6 μm to 9 μm, for example, 6.5 μm to 9 μm, and the outer portion may have a thickness of 0.5 μm to 1.0 μm, for example, 0.7 μm to 1.0 μm. When the average particle diameter (D50), the size (diameter) of the inner portion, and the thickness of the outer portion of the secondary particles of the nickel-based transition metal oxide are within the above ranges, electrochemical cell performance of the battery may be improved.

When XPS analyzing the surface of the positive active material, a ratio ($A_{Ni3+}/A_{Ni2+}$) of a peak area ($A_{Ni3+}$) of $Ni^{3+}$ relative to a peak area ($A_{Ni2+}$) of $Ni^{2+}$ may be greater than or equal to 0.75, greater than or equal to 0.80, greater than or equal to 0.85, greater than or equal to 0.90, greater than or equal to 0.95, greater than or equal to 1.00, greater than or equal to 1.05, greater than or equal to 1.10, greater than or equal to 1.20, greater than or equal to 1.30, greater than or equal to 1.40, greater than or equal to 1.50, greater than or equal to 1.60, or greater than or equal to 1.70. In addition, a ratio ($A_{Co3+}/A_{Co2+}$) of a peak area ($A_{Co3+}$) of $Co^{3+}$ relative to a peak area ($A_{Co2+}$) of $Co^{2+}$ may be greater than or equal to 7.5, greater than or equal to 8.0, greater than or equal to 8.5, greater than or equal to 9.0, greater than or equal to 9.5, or greater than or equal to 10.0. In addition, a ratio ($A_{Mn3+}/A_{Mn4+}$) of a peak area ($A_{Mn3+}$) of $Mn^{3+}$ relative to a peak area ($A_{Mn4+}$) of $Mn^{4+}$ may be less than or equal to 0.10, less than or equal to 0.08, less than or equal to 0.06, less than or equal to 0.04, less than or equal to 0.03, less than or equal to 0.02, or less than or equal to 0.01. As such, the ratios of the peak areas ($A_{Ni3+}/A_{Ni2+}$) and ($A_{Co3+}/A_{Co2+}$) increase, and the ratio of the peak areas ($A_{Mn3+}/A_{Mn4+}$) decreases, thereby increasing average oxidation numbers of Ni, Co, and Mn compared with the conventional positive active material. The increase in the oxidation numbers of Ni and Co is advantageous for electrochemical redox reactions between +3 and +4, so a larger capacity may be expressed since the amount of charge increases. In the case of Mn oxidation number, the ratio of +4 which contributes to structural stability is higher than that of +3, and thus the positive active material has a stable bonding structure and high bonding strength of the secondary particles of the transition metal oxide, thereby positively improving structural stability of the positive active material.

A fraction of at least one transition metal based on 100 at % of the transition metal may have a difference of greater than or equal to 20 at %, for example greater than or equal to 25 at %, or greater than or equal to 30 at %, between the inner portion and the outer portion. When within the above range, electrochemical cell performance of the battery may be improved.

In an embodiment, the positive active material may have a composition in which a fraction of nickel of the inner portion based on 100 at % of the transition metal may be 50 at % or more, 55 at % or more, or 60 at % or more higher than that of nickel of the outer portion based on 100 at % of the transition metal. When within the above range, a fraction of nickel in the inner portion is higher than a fraction of nickel in the outer portion, and the higher nickel content composition in the inner portion acts favorably on capacity characteristics and the relatively lower nickel content composition in the outer portion improves stability against side reactions to improve stability while maintaining capacity compared with other materials having the same composition.

In an embodiment, the positive active material may have a composition in which a fraction of cobalt of the outer portion based on 100 at % of the transition metal may be 30 at % or more, for example 35 at % or more, or 40 at % or more higher than that of cobalt of the inner portion based on 100 at % of the transition metal. When within the above range, since the fraction of cobalt of the outer portion is higher than the fraction of cobalt of the inner portion, a more stable structure may be realized on the surface and the electrical conductivity on the surface may be improved compared with the positive active material having a higher nickel content. Thus, side reactions with the electrolyte on the surface of the positive active material may be suppressed and electrochemical properties such as stability of a battery may be improved.

The primary particles constituting the protruding portions 7 may have a concentration gradient in which the fraction of cobalt (Co) decreases from the outer end portion to the inner end portion.

The outer and inner regions of the primary particles are described with reference to FIG. 8.

Figure 8:
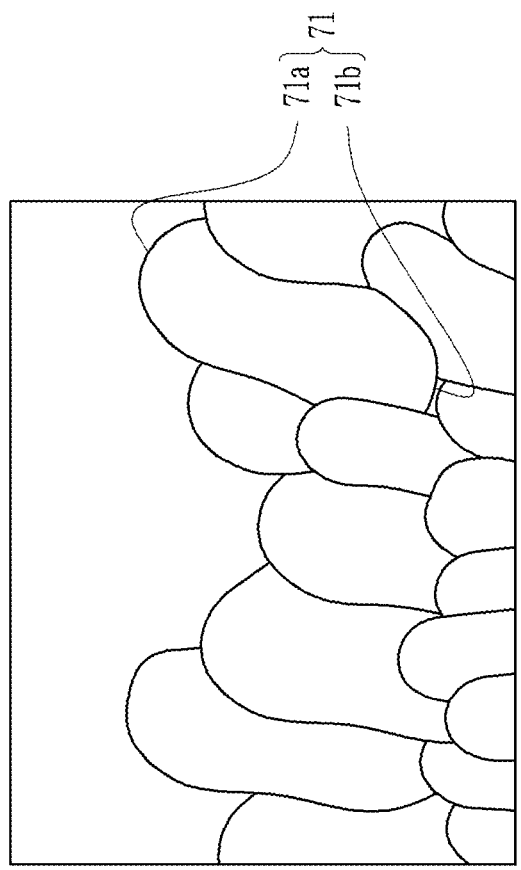
FIG. 8 is a view schematically showing primary particles constituting a protruding portion.

Referring to FIG. 8, when the primary particles 71 constituting the protruding portions 7 are vertically arranged with respect to the inner circle, a region from 20% of the major axis or minor axis of the primary particle 71 from the outer end portion 71a of the primary particle to 40% of the major axis or minor axis of the primary particle 71 from the outer end portion 71a of the primary particle is referred to as an outer region, a region from 20% of the major axis or minor axis from the inner end portion 71b of the primary particle 71 to 40% of the major axis or minor axis from the inner end portion 71b of the primary particle 71 is referred to as an inner region, and a region except the outer region and the inner region is referred to as an intermediate region, the concentrations of cobalt in the outer region, the intermediate region, and the inner region are different from each other.

The cobalt fraction in the outer region is higher than the cobalt fraction in the inner region. In an embodiment, the fraction of cobalt in the outer region may range from 27 at % to 30 at % relative to 100 at % of the transition metals, and the fraction of cobalt in the intermediate region may range from 25 at % to 26 at % relative to 100 at % of the transition metals, and the fraction of cobalt in the inner region may range from 12 at % to 23 at % relative to 100 at % of the transition metals. In an embodiment, the fraction of cobalt in the inner region may be greater than or equal to 12 at %, greater than or equal to 13 at %, greater than or equal to 14 at %, greater than or equal to 15 at %, greater than or equal to 16 at %, greater than or equal to 17 at %, greater than or equal to 18 at %, greater than or equal to 19 at %, or greater than or equal to 20 at % and less than or equal to 23 at %, or less than or equal to 22 at % based on 100 atomic % of the transition metals.

The ratio ($F_2/F_1$) of the fraction ($F_2$) of the cobalt in the inner region to the fraction ($F_1$) of the cobalt in the outer region may be in the range of greater than or equal to 0.60, greater than or equal to 0.61, greater than or equal to 0.62, greater than or equal to 0.63, greater than or equal to 0.64, greater than or equal to 0.65, greater than or equal to 0.66, greater than or equal to 0.67, greater than or equal to 0.68, greater than or equal to 0.69, greater than or equal to 0.70, greater than or equal to 0.71, greater than or equal to 0.72, or greater than or equal to 0.73 and less than or equal to 0.90, less than or equal to 0.89, less than or equal to 0.88, less than or equal to 0.87, less than or equal to 0.86, less than or equal to 0.85, less than or equal to 0.84, less than or equal to 0.83, less than or equal to 0.82, or less than or equal to 0.81.

The secondary particles of the nickel-based transition metal oxide may be a compound represented by Chemical Formula 1.

$$Li_aNi_xCo_yM_{1-x-y}O_2 \quad \text{[Chemical Formula 1]}$$

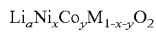

In Chemical Formula 1,
0.9≤a≤1.05, 0.55≤x≤0.95, 0.05≤y≤0.35, and M is at least one metal element selected from Mn, Al, Cr, Fe, V, Mg, Ti, Zr, Nb, Mo, W, Cu, Zn, Ga, In, Sn, La, and Ce.

In Chemical Formula 1, x may be in the range of 0.55≤x≤0.80 or 0.55≤x≤0.70, y may be in the range of 0.10≤y≤0.30 or 0.15≤y≤0.25, and M may include at least one metal element of Mn and Al. It may be desirable that M may include Mn. Thus, capacity characteristics of the battery may be improved.

The positive active material may have a specific surface area of 0.3 m²/g to 0.6 m²/g, for example, 0.32 m²/g to 0.58 m²/g, or specifically 0.35 m²/g to 0.50 m²/g. By having a larger specific surface area than the conventional positive active material, capacity characteristics of the battery may be improved.

The positive active material precursor according to one embodiment includes the secondary particle of the nickel-based transition metal hydroxide having a core and a shell, wherein the core has a high fraction of nickel, the shell has a high fraction of cobalt, the core has higher density than the shell, and the shell has a thickness of greater than or equal to 1 μm, greater than or equal to 1.1 μm, greater than or equal to 1.2 μm, greater than or equal to 1.3 μm, or greater than or equal to 1.4 μm and less than or equal to 2.5 μm, less than or equal to 2.4 μm, less than or equal to 2.3 μm, less than or equal to 2.2 μm, less than or equal to 2.1 μm, less than or equal to 2.0 μm, less than or equal to 1.9 μm, less than or equal to 1.8 μm, less than or equal to 1.7 μm, less than or equal to 1.6 μm, or less than or equal to 1.5 μm.

In the secondary particle of the nickel-based transition metal hydroxide, the core may have a dense structure having higher density than that of the shell, but the shell may have a porous structure having lower density than that of the core.

The fraction of nickel in the core may be greater than or equal to 70 at %, greater than or equal to 80 at %, or greater than or equal to 90 at % based on 100 at % of the transition metal, and may be less than or equal to 50 at %, less than or equal to 40 at %, less than or equal to 30 at %, less than or equal to 20 at %, or less than or equal to 10 at % based on 100 at % of the transition metal.

The fraction of nickel in the shell may be 10 at % to 40 at %, for example 15 at % to 30 at %, based on 100 at % of the transition metal, and the fraction of cobalt in the shell may be 50 at % to 70 at %, for example 55 at % to 65 at %, based on 100 at % of the transition metal.

The secondary particles of the nickel-based transition metal hydroxide may have an larger average particle diameter (D50) than that of the secondary particles of the nickel-based transition metal oxide by 1 μm to 3 μm, and the reason may be that portions of the porous shells of the secondary particles of the nickel-based transition metal hydroxide are aggregated and diffused inside during the preparation of the positive active material. Accordingly, in the secondary particles of the nickel-based transition metal oxide, the dense structure having higher density at the inner portion than the outer portion, and the protruding portions in the outer portion, may be well formed.

Another embodiment provides a method of preparing the positive active material.

Hereinafter, a method of preparing the positive active material is described in detail.

The method of preparing the positive active material includes: introducing a metal solution for forming a core including a transition metal compound represented by Chemical Formula 2, a chelating agent, and a precipitating agent into a reactor to prepare a precursor core by co-precipitation; adding a metal solution for forming a shell including a transition metal compound represented by Chemical Formula 3 to prepare a precursor shell on the precursor core by co-precipitation, followed by filtering, washing, and drying the produced material, to prepare the secondary particle of the nickel-based transition metal hydroxide; and mixing the secondary particle of the nickel-based transition metal hydroxide and a lithium salt to continuously perform a first heat treatment and a second heat treatment to prepare a secondary particle of the nickel-based transition metal oxide.

$$Ni_xCo_yM_{1-x-y}(SO)_4 \quad \text{[Chemical Formula 2]}$$

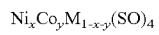

In Chemical Formula 2,
0.70≤x, y≤0.30, and M is at least one metal element selected from Mn, Al, Cr, Fe, V, Mg, Ti, Zr, Nb, Mo, W, Cu, Zn, Ga, In, Sn, La, and Ce.

$$Ni_xCo_yM_{1-x-y}(SO)_4 \quad \text{[Chemical Formula 3]}$$

In Chemical Formula 3,
0.05≤x≤0.45, 0.50≤y≤0.80, and M is at least one metal element selected from Mn, Al, Cr, Fe, V, Mg, Ti, Zr, Nb, Mo, W, Cu, Zn, Ga, In, Sn, La, and Ce.

The preparing of the precursor core by the co-precipitation method is as follows.

A chelating agent and a precipitating agent are put in a reactor, and metal raw materials are added thereto to perform a reaction. The reaction may be performed by adjusting a stirring speed in a range of 500 rpm to 1500 rpm, for example, 700 rpm to 1300 rpm, for 20 hours to 50 hours, to synthesize a precursor core having a size of 7 μm to 10 μm.

The chelating agent plays a role of controlling a reaction rate of forming precipitates in a co-precipitation reaction, and may include, for example, ammonia (NH₄OH), citric acid, and the like. In one embodiment, the ammonia (NH₄OH) may be desirably used. The chelating agent may be used, for example, in an amount of 0.1 M to 1.5 M, for example, 0.7 M to 1.2 M, at 70 ml/min to 150 ml/min or 100 ml/min to 140 ml/min.

The precipitating agent plays a role of controlling pH of the reaction mixture and forming the precipitates, and may include, for example, sodium hydroxide (NaOH), sodium carbonate (Na₂CO₃), sodium oxalate (Na₂C₂O₄), and the like. The sodium hydroxide (NaOH) may be desirable. As the reaction proceeds, when pH of the reaction mixture in the reactor is changed, a pH controlling agent may be added, if needed, to control pH of the reaction mixture to a range of 10 to 12, and specifically, 11.

The metal solution for forming a core is prepared by mixing a nickel compound, a compound including the M metal element, and a cobalt compound in pure water, and then stirring the mixture to obtain a compound represented by Chemical Formula 2. A concentration of the metal solution may be in a range of 1.0 M to 2.5 M, for example, 1.5 M to 2.5 M, and the metal raw materials are added at 70 ml/min to 150 ml/min or 100 ml/min to 140 ml/min.

Subsequently, after the precursor core synthesis, the composition in a reactor supply line (feed line) is replaced with a metal solution for forming a precursor shell to continuously perform a reaction and thus form a precursor shell. Herein, the chelating agent is added at 70 ml/min to 150 ml/min, or 100 ml/min to 140 ml/min, $N_2$ gas is continuously injected while the reaction proceeds, a stirring speed in the reactor is adjusted within a range of 500 rpm to 1500 rpm, for example, 700 rpm to 1300 rpm, and the reaction time is adjusted within 20 hours to 50 hours to synthesize a precursor shell having a thickness of 1.5 µm to 2.0 µm on the precursor core.

The metal solution for a shell is obtained by mixing a nickel compound, a compound containing the M metal element, a cobalt compound, and the like in pure water and stirring the mixture to obtain the compound represented by Chemical Formula 3. A concentration of the metal solution may be within 1.0 M to 2.5 M, for example, 1.5 M to 2.5 M, and the metal raw materials are added at 70 ml/min to 150 ml/min or 100 ml/min to 140 ml/min.

Subsequently, the prepared material is collected from the reactor, filtered, and then washed and dried to obtain the secondary particles of the nickel-based transition metal hydroxide.

The filtering and washing may be performed to filter and remove impurity salts ($Na^+$, $SO_4^{2-}$, $NH^{3+}$, $OH^-$, and the like) after recovering the synthesized precursor from the reactor, and then to wash the filtered precursor powder with distilled water.

Subsequently, the secondary particles of the nickel-based transition metal hydroxide are mixed with a lithium salt and then sequentially primarily heat-treated and secondarily heat-treated to obtain the secondary particles of the nickel-based transition metal oxide.

Specifically, a lithium raw material such as $Li_2CO_3$, $LiNO_3$, $LiNO_2$, LiOH, $LiOH \cdot H_2O$, LiH, LiF, LiCl, LiBr, LiI, $CH_3OOLi$, $Li_2O$, $Li_2SO_4$, a lithium dicarboxylate salt, lithium citrate, a lithium fatty acid salt, and alkyl lithium as the lithium salt is sufficiently mixed with the positive active material precursor powder including the secondary particle of the nickel-based transition metal hydroxide. Herein, a mole ratio of Li:(Ni+Co+Mn) may be 0.95:1 to 1.1:1, for example 1:1 to 1.05:1.

The first heat treatment may be performed in an oxygen atmosphere including 99.0 volume % to 99.9 volume % of oxygen, at 450° C. to 550° C., for example, 500° C. to 550° C., for 5 hours to 10 hours.

In addition, the second heat treatment may be performed in an oxygen atmosphere including 99.0 volume % to 99.9 volume % of oxygen, at 750° C. to 850° C., for example 800° C. to 850° C., for 5 hours to 15 hours.

On the other hand, the first heat treatment may be performed at a temperature increasing rate of 3° C./min to 5° C./min, and the second heat treatment may be performed at a temperature increasing rate of 3° C./min to 5° C./min and at a cooling rate of 5° C./min to 15° C./min.

Thereafter, the first and second heat-treated materials are continuously pulverized and impurities are filtered to obtain the positive active material including the secondary particles of the nickel-based transition metal oxide.

Another embodiment provides a rechargeable lithium battery including a positive electrode including a positive active material, a negative electrode including a negative active material, and an electrolyte.

The positive electrode includes a current collector and a positive active material layer formed on the current collector, and the positive active material layer includes a positive active material.

In the positive active material layer, an amount of the positive active material may be 90 wt % to 98 wt % based on a total weight of the positive active material layer. In addition, the positive active material layer may further include a binder and a conductive material. An amount of the binder and the conductive material may be 1 wt % to 5 wt %, respectively, based on a total weight of the positive active material layer.

The positive active material is as described above.

The binder may include polyvinyl alcohol, carboxylmethyl cellulose, hydroxypropyl cellulose, diacetyl cellulose, polyvinyl chloride, polyvinylfluoride, polyvinylpyrrolidone, polyurethane, polytetrafluoroethylene, polyvinylidene fluoride, polyethylene, polypropylene, a styrene-butadiene rubber, an acrylated styrene butadiene rubber, an epoxy resin, nylon, and the like, but is not limited thereto.

Examples of the conductive material may include a carbon-based material such as natural graphite, artificial graphite, carbon black, acetylene black, ketjen black, carbon fiber, and the like; a metal-based material of a metal powder or a metal fiber including copper, nickel, aluminum, silver, and the like; a conductive polymer such as a polyphenylene derivative; or a mixture thereof.

The current collector may include an aluminum foil, a nickel foil, or a combination thereof, but is not limited thereto.

The negative electrode includes a current collector, and a negative active material layer formed on the current collector and including a negative active material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include a carbonaceous material. The carbonaceous material may be any generally-used carbon-based negative active material in a rechargeable lithium ion battery. Examples thereof may be crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, SiOx (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but is not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but is not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of 95 wt % to 99 wt % based on the total weight of the negative active material layer.

In an embodiment of the present invention, the negative active material layer may include a binder, and optionally a conductive material. In the negative active material layer, an amount of the binder may be 1 wt % to 5 wt % based on a total weight of the negative active material layer. When the negative active material layer further includes a conductive material, the negative active material layer includes 90 wt % to 98 wt % of the negative active material, 1 wt % to 5 wt % of the binder, and 1 wt % to 5 wt % of the conductive material.

The binder improves binding properties of negative active material particles with one another and with a current collector. The binder includes a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyepichlorohydrine, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose-based compound may be further used as a thickener to provide viscosity. The cellulose-based compound includes one or more of carboxymethyl cellulose, hydroxypropylmethyl cellulose, methyl cellulose, or alkali metal salts thereof. The alkali metals may be Na, K, or Li. Such a thickener may be included in an amount of 0.1 parts by weight to 3 parts by weight based on 100 parts by weight of the negative active material.

The conductive material may include: a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include at least one selected from a copper foil, a nickel foil, a stainless steel foil, a titanium foil, a nickel foam, a copper foam, a polymer substrate coated with a conductive metal, and a combination thereof.

The electrolyte includes a non-aqueous organic solvent and a lithium salt.

The non-aqueous organic solvent serves as a medium for transmitting ions taking part in the electrochemical reaction of a battery.

The non-aqueous organic solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), methyl acetate, ethyl acetate, n-propyl acetate, dimethylacetate, methyl propionate, ethyl propionate, decanolide, mevalonolactone, caprolactone, dibutyl ether, tetraglyme, diglyme, dimethoxyethane, 2-methyltetrahydrofuran, tetrahydrofuran, cyclohexanone, ethanol, isopropyl alcohol, nitriles such as R—CN (where R may be a C2 to C20 linear, branched, or cyclic hydrocarbon group and R may include a double bond, an aromatic ring, or an ether bond), and the like, amides such as dimethyl formamide and the like, dioxolanes such as 1,3-dioxolane and the like, sulfolanes, and the like.

The organic solvent may be used alone or in a mixture. When the organic solvent is used in a mixture, a mixing ratio may be controlled in accordance with a desirable battery performance.

In addition, the organic solvent may further include an aromatic hydrocarbon-based organic solvent. Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4 trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive of vinylene carbonate or an ethylene carbonate-based compound as a cycle-life improvement additive.

Examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the cycle-life improvement additive may be within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (wherein x and y are natural numbers, for example an integer of 1 to 20), LiCl, LiI, and $LiB(C_2O_4)_2$ (lithium bis(oxalato) borate, LiBOB). A concentration of the lithium salt may range from 0.1 M to 2.0 M. When the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a type of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
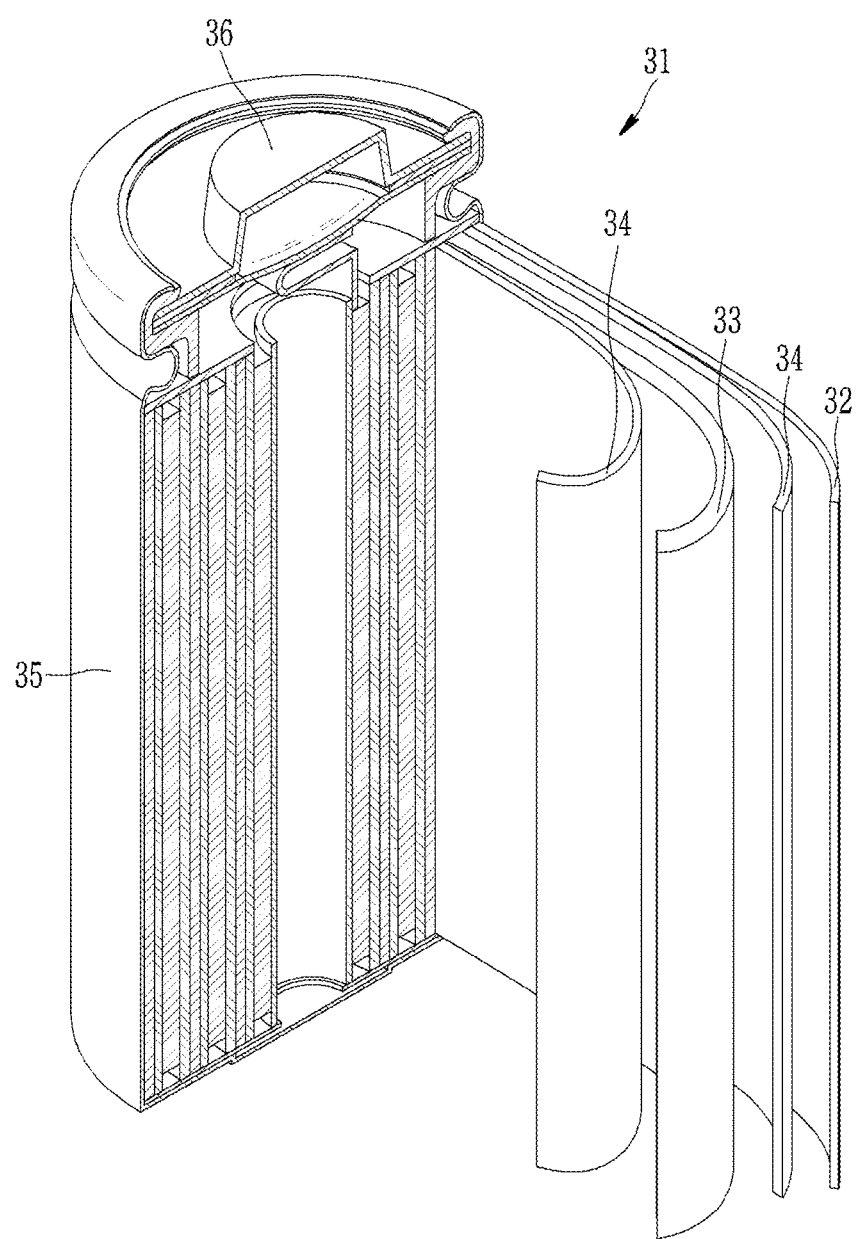
FIG. 2 is a perspective view schematically showing a typical structure of a rechargeable lithium battery.

FIG. 2 is a perspective view schematically showing a typical structure of a rechargeable lithium battery according to an embodiment.

Referring to FIG. 2, a rechargeable lithium battery 31 according to an embodiment includes a positive electrode 33 including the positive active material, a negative electrode 32, and a separator 34. The aforementioned positive electrode 33, negative electrode 32, and separator 34 are wound or folded to be accommodated in a battery case 35. Subsequently, an organic electrolyte is injected into the battery case 35 and sealed with a cap assembly 36 to complete the rechargeable lithium battery 31. The battery case 35 may have a cylindrical shape, a square shape, or a thin film shape.

The rechargeable lithium battery 31 may be a lithium ion battery.

The separator 34 is disposed between the positive electrode 33 and the negative electrode 32, and is wound and laminated together to form an electrode assembly. The electrode assembly is housed in the battery case 35 and impregnated with an organic electrolyte solution, and then sealed to complete a rechargeable lithium battery 31.

In addition, the rechargeable lithium battery consists of circuits and thus forms a battery pack, and accordingly, a single battery pack or more than one battery pack may be used for all devices requiring high capacity and high power, as needed. For example, the rechargeable lithium battery may be used for a laptop, a smart phone, an electric vehicle, and the like. In addition, the rechargeable lithium battery has excellent storage stability at a high temperature, and also has excellent cycle-life characteristics and high-rate characteristics, and thus may be used for electric vehicles (EV). For example, the rechargeable lithium battery may be used for hybrid vehicles such as plug-in hybrid electric vehicles (PHEV) and the like.

Hereinafter, examples of the present invention and comparative examples are described. These examples, however, are not in any sense to be interpreted as limiting the scope of the invention.

EXAMPLES

Example 1

Example 1-1: Synthesis of Precursor

A 2 M metal solution for forming a $Ni_{0.8}Co_{0.1}Mn_{0.1}SO_4$ precursor core and a 2 M metal solution for forming a $Ni_{0.2}Co_{0.6}Mn_{0.2}SO_4$ precursor shell, and in addition, a sodium hydroxide (NaOH, 2 M) precipitating agent and a $NH_4OH$ (1 M) chelating agent, were prepared.

A reactor was filled with distilled water and set at 50° C., and $N_2$ gas was injected thereinto to form an $N_2$ atmosphere. Subsequently, the sodium hydroxide (NaOH) solution was put in the reactor to maintain pH 11.

The metal solution for forming a precursor core was put in the reactor at 120 ml/h and then supplied with the chelating agent at 120 ml/h to perform a reaction. While the reaction proceeded, $N_2$ gas was continuously injected thereinto, and the reactor temperature of 50° C., a stirring speed of 1000 rpm, and pH 11 were maintained. In order to synthesize a precursor core having a size of 7 μm to 10 μm, the reaction was performed for 34 hours.

After the precursor core synthesis, the composition in the reactor supply line (feed line) was replaced with the metal solution for a precursor shell and put in the reactor at 120 ml/h to continuously perform a reaction, and then the chelating agent was supplied at 120 ml/h. While the reaction proceeded, the $N_2$ gas was continuously injected therein, wherein the stirring speed was set at 1000 rpm and pH 10 was maintained. In order to synthesize a shell having a thickness of 1.5 μm to 2.0 μm, the reaction was performed for a predetermined time to prepare a precursor.

Finally, the synthesized precursor was collected from the reactor and filtered to primarily remove impurity salts ($Na^+$, $SO_4^{2-}$, $NH^{3+}$, $OH^-$, and the like), and the filtered precursor powder was put in a 5 L beaker and washed with distilled water. After the washing, when pH of the solution was measured and became neutral, the solution was filtered again to collect the precursor powder, and then dried in an 80° C. vacuum oven.

Example 1-2: Synthesis of Positive Active Material

The precursor and the lithium salt according to Example 1-1 were ball-milled to have a Li/Me mole ratio of 1.03 by using a ball milling machine at 50 rpm for 3 hours, and then dried in a 50° C. oven for 8 hours.

The dried material was heat-treated at a high temperature in a furnace. The heat treatment was performed at 550° C. for 10 hours under an $O_2$ atmosphere, and subsequently at 850° C. for 15 hours. The heat-treated material was pulverized, and impurities were filtered therefrom to obtain a positive active material.

Example 1-3: Manufacture of Half Cell

The positive active material of Example 1-2:a conductive agent (Super P):a binder solution (10 wt % PVDF in NMP) were mixed in a weight ratio of 90:5:5 to prepare a slurry. The prepared slurry was coated on an Al foil, dried in a 120° C. drying oven for 3 hours, and compressed to manufacture an electrode plate (L/L: 11.5 mg/cm$^2$, electrode density: 2.8 g/cm$^3$).

The compressed electrode plate was punched to have a size of 12Φ, and then dried in a 120° C. vacuum oven for 12 hours.

The dried electrode plate was manufactured into a 2032 coin type of half cell in a globe box (under an Ar atmosphere) in a common method. Herein, for a counter electrode, a lithium foil (Li foil) was used, for a separator, a porous polypropylene separator (thickness: 15 μm, diameter: 19 Φ) was used, and for an electrolyte solution, a solution prepared by dissolving $LiPF_6$ in an organic solvent (EC: DMC=a volume ratio of 3:7) at a concentration of 1 M was used.

Example 1-4: Manufacture of Full Cell

A negative electrode (L/L: 7.2 mg/cm$^2$, density: 0.78 g/cm$^3$) was manufactured by casting a hard carbon negative active material:a conductive material:a binder in a weight ratio of 92:1:7, and was designed to have an N/P (negative and positive electrode) ratio of 1.15 (a reversible capacity ratio). A full cell was manufactured according to the same method as that of the half cell according to Example 1-3, except that this negative electrode was used.

Example 2

A precursor, a positive active material, a half cell, and a full cell were manufactured according to the same method as Example 1, except that the precursor shell was synthesized to have a thickness of 1.0 μm.

Example 3

A precursor, a positive active material, a half cell, and a full cell were manufactured according to the same method as Example 1, except that the precursor shell was synthesized to have a thickness of 2.0 μm.

Example 4

A precursor, a positive active material, a half cell, and a full cell were manufactured according to the same method as Example 1, except that a metal solution for a $Ni_{0.7}Co_{0.1}Mn_{0.2}SO_4$ 2 M precursor core and a metal solution for a $Ni_{0.3}Co_{0.5}Mn_{0.2}SO_4$ 2 M precursor shell were prepared.

Comparative Example 1

A half cell and a full cell were manufactured according to the same method as Example 1, except that NCM622 ($LiNi_{0.6}Co_{0.2}Mn_{0.2}$, L&F Co., Ltd.) was used as a positive active material.

Comparative Example 2

A precursor, a positive active material, a half cell, and a full cell were manufactured according to the same method as Example 1, except that the precursor shell was formed to have a thickness of about 3.0 μm.

Evaluation Examples

Figure 3A:
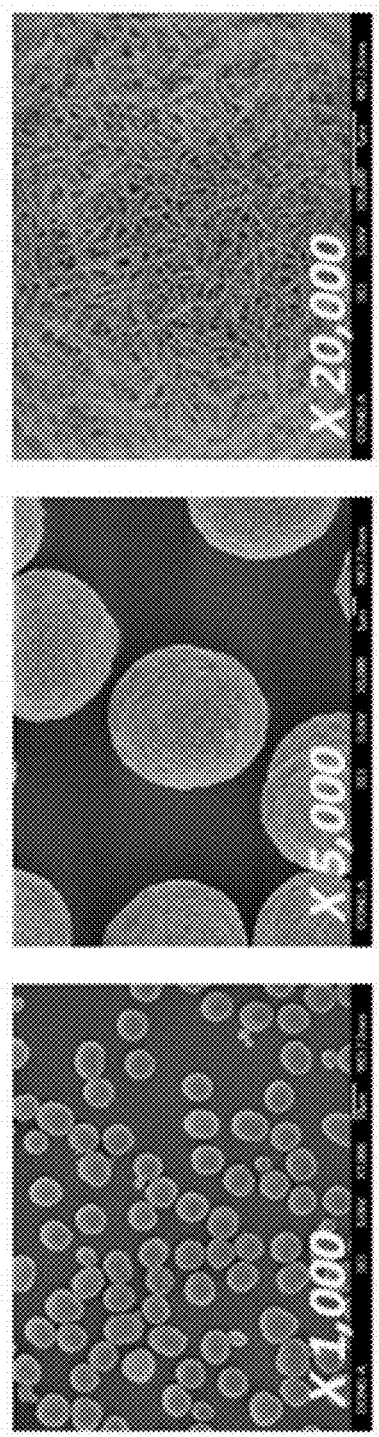
FIG. 3A illustrates SEM images showing a core of a positive active material precursor according to Example 1 with different magnifications.
Figure 3B:
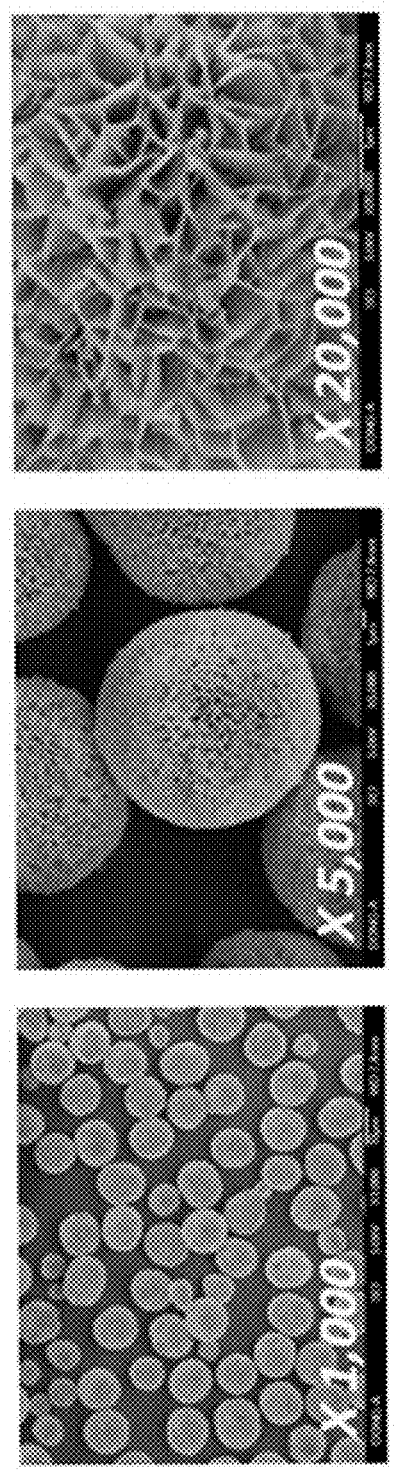
FIG. 3B illustrates SEM images showing the surface of the positive active material precursor having both the core and a shell according to Example 1 with different magnifications.
Figure 3C:
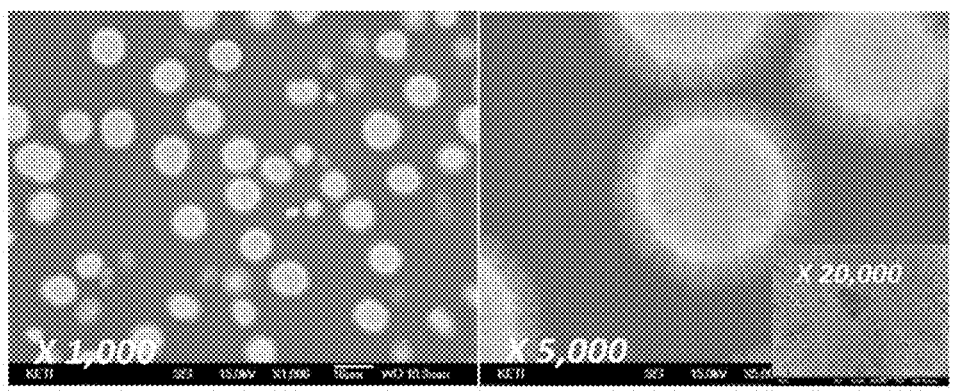
FIG. 3C illustrates SEM images showing the cross-section of the positive active material precursor having the core and the shell with different magnifications.

Scanning Electron Microscope (SEM) Image Analysis of Positive Active Material Precursor SEM images of the core of the positive active material precursor according to Example 1, the positive active material precursor having both core and shell, and the cross-section of the positive active material precursor are shown in FIGS. 3A to 3C, respectively.

Referring to FIGS. 3A to 3C, the positive active material precursor was synthesized to have a large surface area, a porous structured shell, and an average particle diameter of 11 μm to 12 μm by synthesizing a precursor core having a high content of nickel and thus high particle density, and then applying a precursor shell having a high content of cobalt thereto.

Figure 4A:
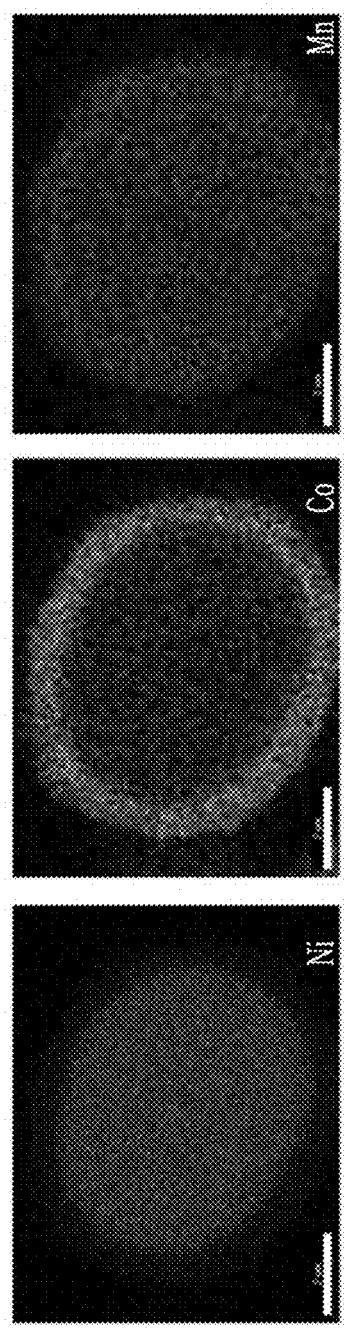
FIGS. 4A and 4B illustrate images and a graph measured by energy dispersive spectroscopy (EDX) of the positive active material precursor according to Example 1 and a graph showing the amount of Mn, Co, and Ni according to the distance from the surface of the positive active material precursor obtained therefrom.
Figure 4B:
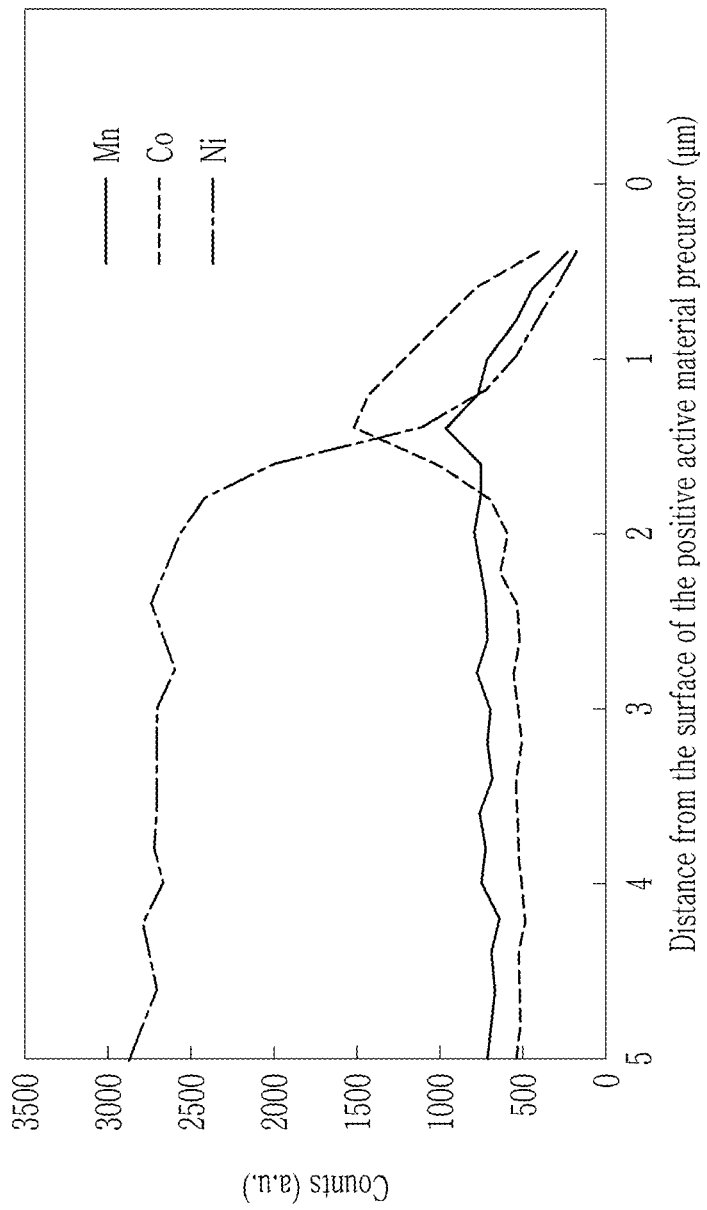

Measurement of Energy Dispersive Spectroscopy (EDX) of Positive Active Material Precursor The positive active material precursor of Example 1 was EDX-mapped, and the results are shown in FIG. 4A, and the amounts of Mn, Co, and Ni according to the distance from the surface of the positive active material precursor obtained from FIG. 4A were measured and shown in FIG. 4B.

Referring to FIGS. 4A and 4B, the core of the positive active material precursor included nickel in a high content, while the shell included cobalt in a high content, and accordingly, a sharp composition change was found on a boundary (1.0 μm to 2.5 μm from the surface of the positive active material precursor) of the core and the shell.

Particle Shape of Positive Active Material Precursor and Positive Active Material Depending on Shell Thickness of Positive Active Material Precursor SEM images of the surfaces of the positive active material precursors and the positive active materials according to Examples 1 to 4 and Comparative Example 2 were obtained. Among them, surface SEM images of the positive active material precursor according to Example 1 and the positive active material precursor according to Comparative Example 2 are shown in FIG. 5A, and surface SEM images of the positive active material according to Example 1 and the positive active material according to Comparative Example 2 are shown in FIG. 5B.

Figure 5A:
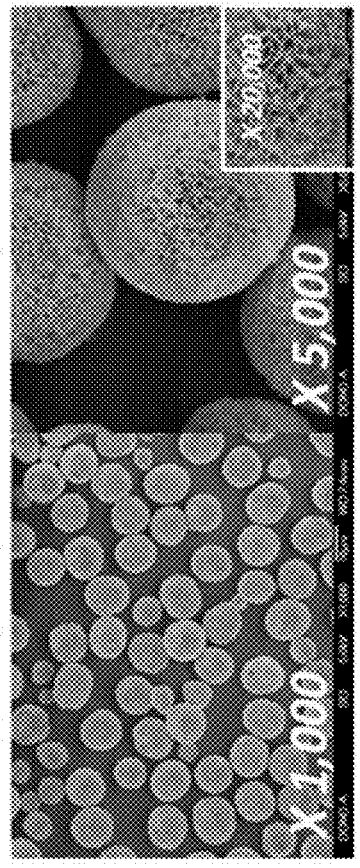
FIG. 5A illustrates SEM images showing the surfaces of positive active material precursors according to Example 1 and Comparative Example 2 with different magnifications.
Figure 5A:
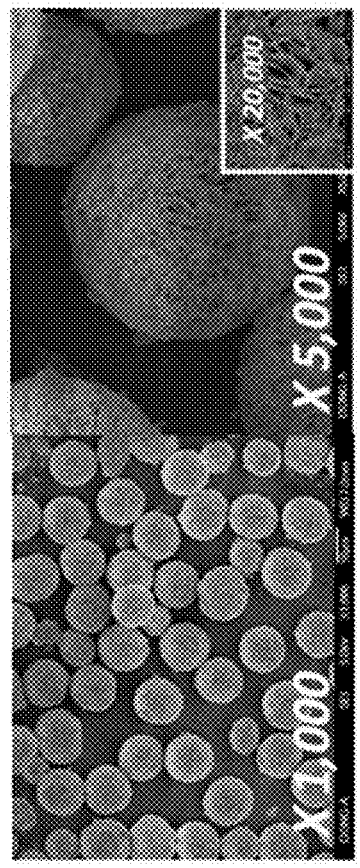
Figure 5B:
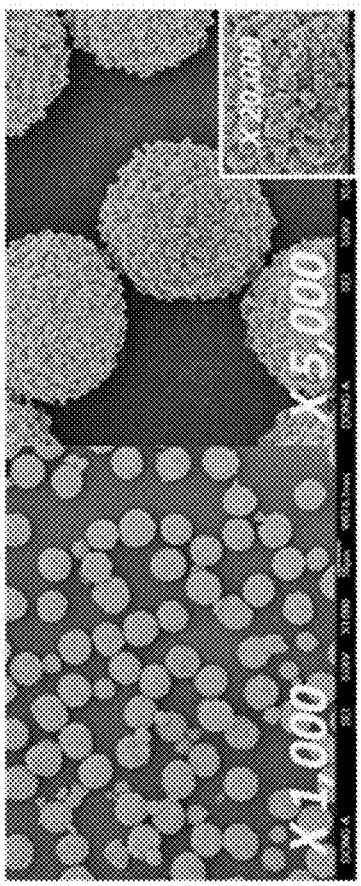
FIG. 5B illustrates SEM images showing the surfaces of positive active material according to Example 1 and Comparative Example 2 with different magnifications.
Figure 5B:
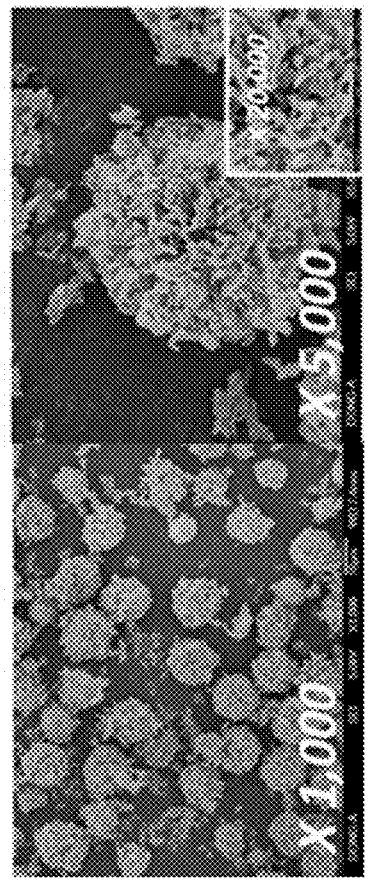

Referring to FIG. 5A, the positive active material precursor according to Example 1 includes a shell having a porous structure on the surface, and referring to FIG. 5B, the positive active material having excellent density is prepared. To the contrary, from FIGS. 5A and 5B, it was confirmed that in the case of the positive electrode active material according to Comparative Example 2, since the shell thickness of the precursor was thick, a particle density of the positive active material synthesized therefrom was greatly reduced. In other words, as a shell thickness increases, an active material has weaker particle strength, and accordingly, the shell thickness of the positive active material precursor needs to be controlled within 1.0 to 2.5 μm.

Scanning Electron Microscope (SEM) Image of Positive Active Material

Figure 6A:
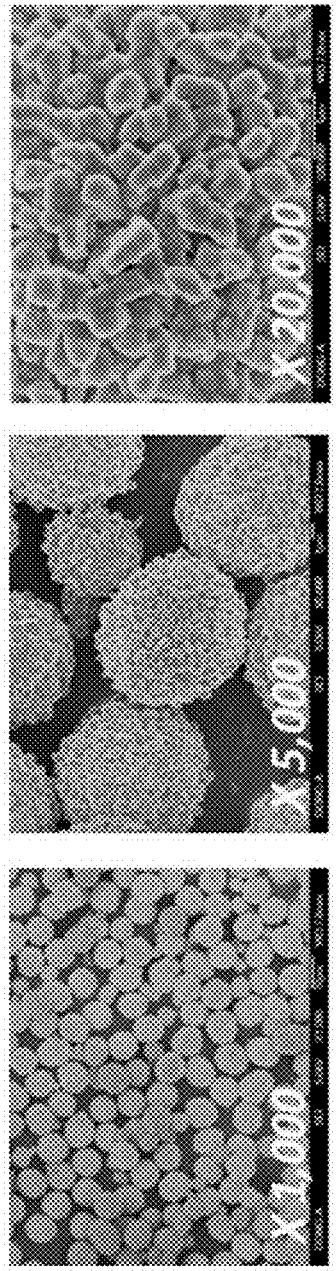
FIG. 6A illustrates SEM images of the surfaces of the positive active materials according to Example 1 and Comparative Example 1.
Figure 6A:
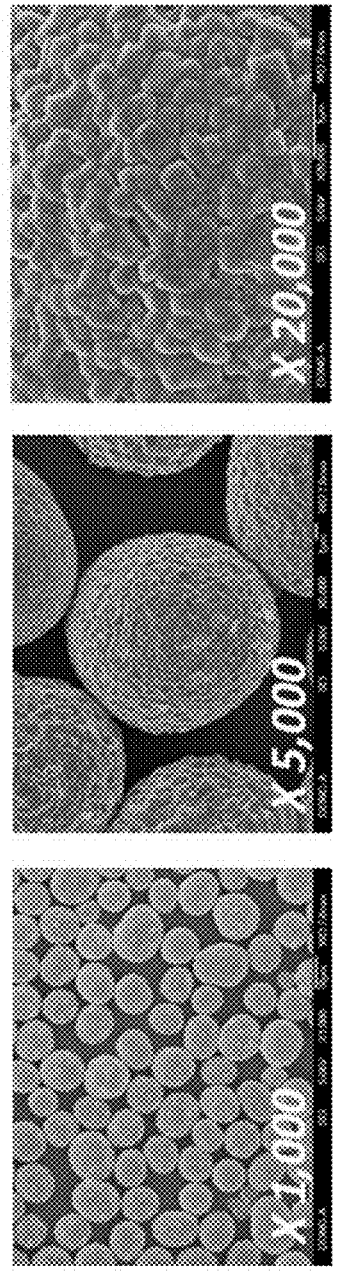
Figure 6B:
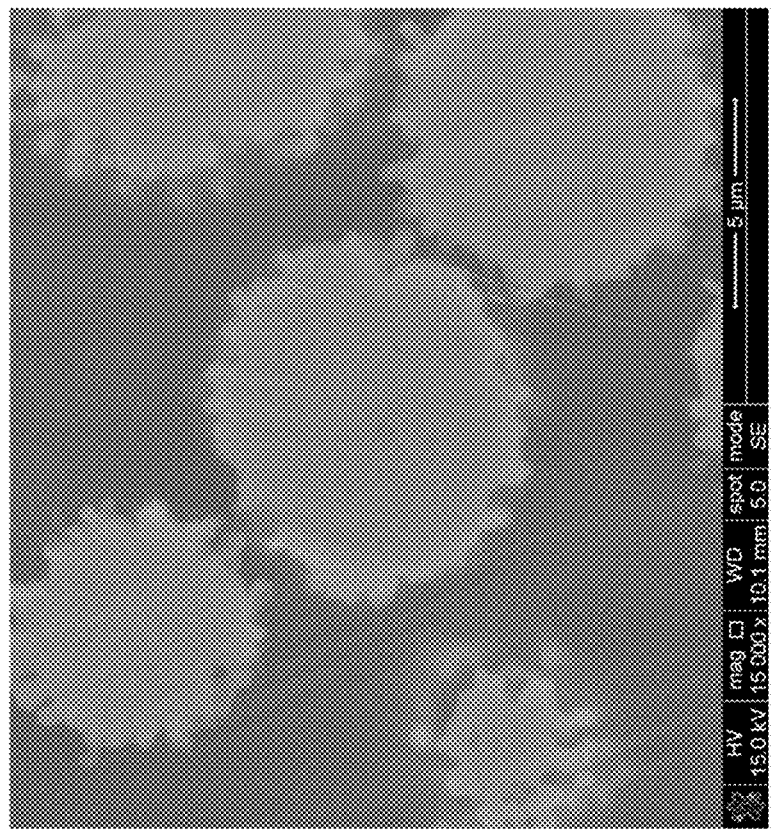
FIG. 6B is a SEM image showing the cross-section of the positive active material according to Example 1.

SEM images of the positive active materials of Example 1 and Comparative Example 1 are shown in FIG. 6A, and a particle cross-section SEM image of the positive active material of Example 1 was additionally shown in FIG. 6B.

Referring to FIGS. 6A and 6B, in the synthesis of the positive active material of Example 1, a particle size of the positive active material was 9 to 10 μm and was decreased from that of the positive active material precursor, which was caused by forming a plurality of protruding portions on the particle surface portion (outer portion) of the positive active material. Accordingly, the positive active material of Example 1 was observed to have a relatively larger specific surface area than that of Comparative Example 1. In addition, even though the positive active material precursor formed a composite interface structure, the positive active material having similarly excellent particle density to that of Comparative Example 1 as a firing result was obtained.

Area of Protruding Portions and Aspect Ratio of a Plurality of Protruding Portions based on Cross-section of Positive Active Material (Scanning Electron Microscope (SEM) Image)

Figure 7B:
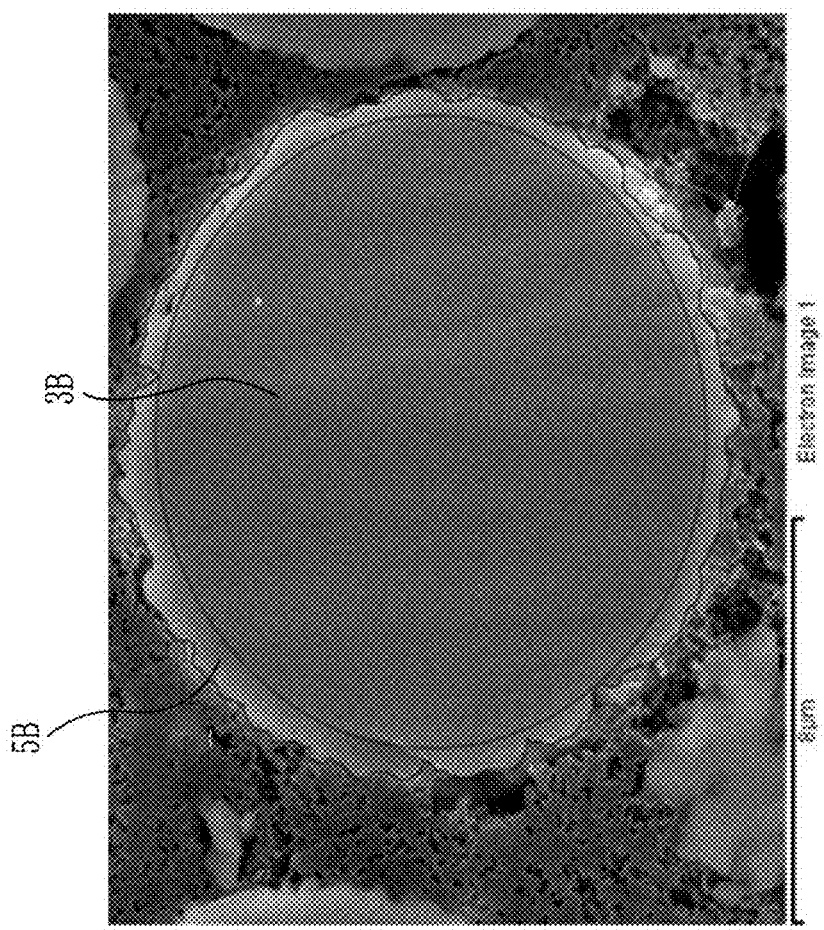
FIG. 7B shows marks distinguishing an inner portion and an outer portion (including protruding portion) in the cross-sectional SEM image of the positive active material according to Comparative Example 1.

Particle cross-sectional SEM image of the positive active material of Example 1 is shown in FIG. 7A. Referring to FIG. 7A, it can be seen that the positive active material according to Example 1 has a plurality of protruding portions. The cross-sectional SEM images of the positive active materials according to Example 1 and Comparative Example 1 were analyzed to calculate the areas occupied by the protruding portions. The cross-sectional SEM images were analyzed using ImageJ (National Institutes of Health). FIG. 7A is a cross-sectional SEM image of the positive active material prepared according to Example 1 which shows the inner portion 3A and the outer portion 5A of the particles separately, and FIG. 7B is a cross-sectional SEM image of the positive active material prepared according to Comparative Example 1 which shows the inner portion 3B and the outer portion 5B of the particle, separately.

The ratios of the areas occupied by the plurality of protruding portions relative to the total area of the particles from the cross-sectional SEM images shown in FIGS. 7A and 7B are calculated (using the ImageJ program) and shown in Table 1.

In addition, when in the plurality of protruding portions of the positive active material particles, the length of the narrowest portion is referred to as a width (W), and the length to the outer end portion of the protruding portion and the inner circle is referred to as a height (H), the widths and heights of the protruding portions and aspect ratios (H/W) calculation results (results analyzed by ImageJ) in the particle cross-sections of the positive active materials according to Example 1 and Comparative Example 1 are shown in Table 2.

TABLE 1

| | Total area ($A_t$) (µm²) | Area of inner circle ($A_i$) (µm²) | Area of protruding portions ($A_t$-$A_i$) (µm²) | Area ratio of the protruding portions ([$A_t$-$A_i$])/$A_t$) (%) |
|---|---|---|---|---|
| Comparative Example 1 | 127.25 | 107.54 | 19.716 | 15.49 |
| Example 1 | 53.22 | 39.21 | 14.01 | 26.32 |

TABLE 2

| | Height (H, µm) | Width (W, µm) | Aspect ratio (H/W) |
|---|---|---|---|
| Example 1 | 0.804 | 0.419 | 2.00 |
| Comparative Example 1 | 0.818 | 1.123 | 0.75 |

Referring to Table 1 and FIGS. 7A and 7B, the positive active material of Example 1 exhibited an increased area ratio of the protruding portions on the cross-section compared with that of Comparative Example 1. From Table 2, the results of Example 1 show that the numerical range of the aspect ratio of the protruding portions is higher than that of Comparative Example 1.

Measurement of Energy Dispersive Spectroscopy (EDX) of Positive Active Material

EDX mapping from the outer end portion to the inner end portion of the protruding portion of the positive active material according to Example 1 which is shown in FIG. 8 is performed and the results are shown in Table 3.

TABLE 3

| Distance from the outer end portion of the protruding portions (nm) | Ni (at %) | Co (at %) | Mn (at %) |
|---|---|---|---|
| 0 to 70 | 54.1 | 29.7 | 16.2 |
| 260 to 330 | 58.9 | 26.1 | 15.0 |
| 460 to 530 | 66.8 | 22.6 | 10.6 |

Referring to Table 3, the content of cobalt decreases from the outer end portion to the inner end portion of the protruding portion.

Oxidation Number Change of Ni and Mn on Positive Active Material Surface

Oxidation number changes of Ni, Co, and Mn on the surfaces of the positive active materials according to Example 1 and Comparative Example 1 were measured through X-ray photoelectron spectroscopy (XPS, High-performance X-ray Photoelectron Spectrometer made by Thermoscientific, Energy source: microfocused monochromated Al-Kα (1486.6 eV)).

Each spectrum was calibrated based on C1s binding energy of 284.6 eV and then analyzed. In the spectrum of each transition metal, binding types present in the corresponding spectrum for dividing the spectrum depending on the oxidation number of each transition metal, and binding energy depending on the oxidation number were analyzed in advance. Subsequently, the entire spectrum in which each spectrum was mixed and combined was examined with respect to a peak distribution depending on the transition metal oxidation numbers through fitting each spectrum.

On the other hand, as for nickel used in the research, the binding energy (hereinafter referred to as BE) of 2p3/2 of $Ni^{2+}$ appeared around 854 eV, and BE of 2p3/2 of $Ni^{3+}$ appeared around a region of 855.8 eV. As for cobalt, BE of 2p3/2 of $Co^{2+}$ appeared around a region of 780.4 eV, and BE of 2p3/2 of $Co^{3+}$ appeared around a region of 779.5 eV. As for Mn, BE of 2p3/2 of $Mn^{3+}$ appeared around a region of 641.6 eV, and BE of 2p3/2 of $Mn^{4+}$ appeared around a region of 642.4 eV.

Referring to the analyzed XPS data, each spectrum depending on the transition metal oxidation numbers was well distributed in the specified BE regions.

Figure 9A:
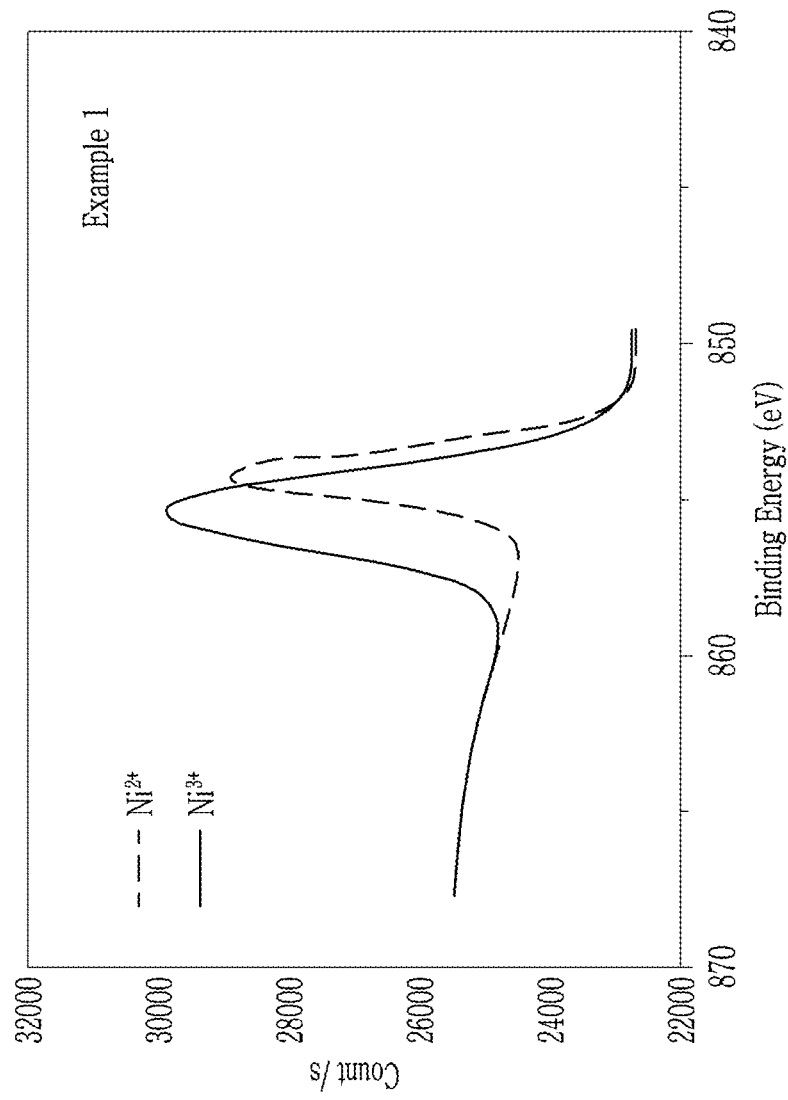
Figure 9C:
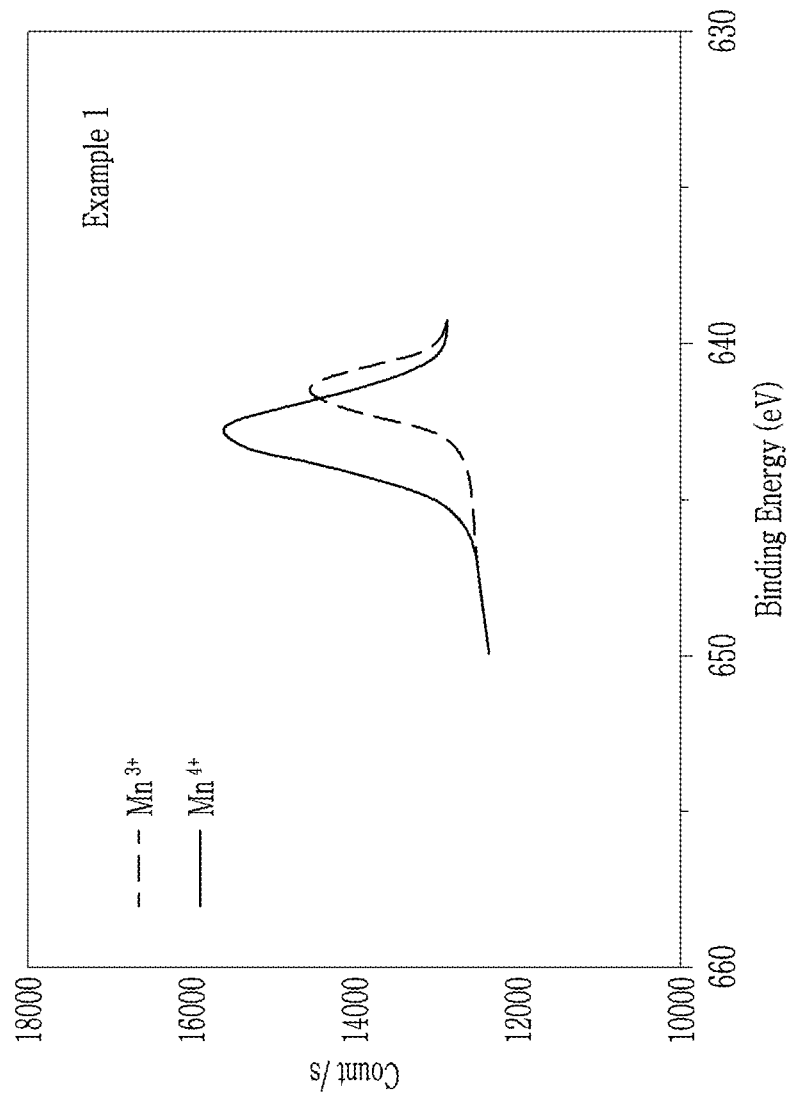
Figure 9D:
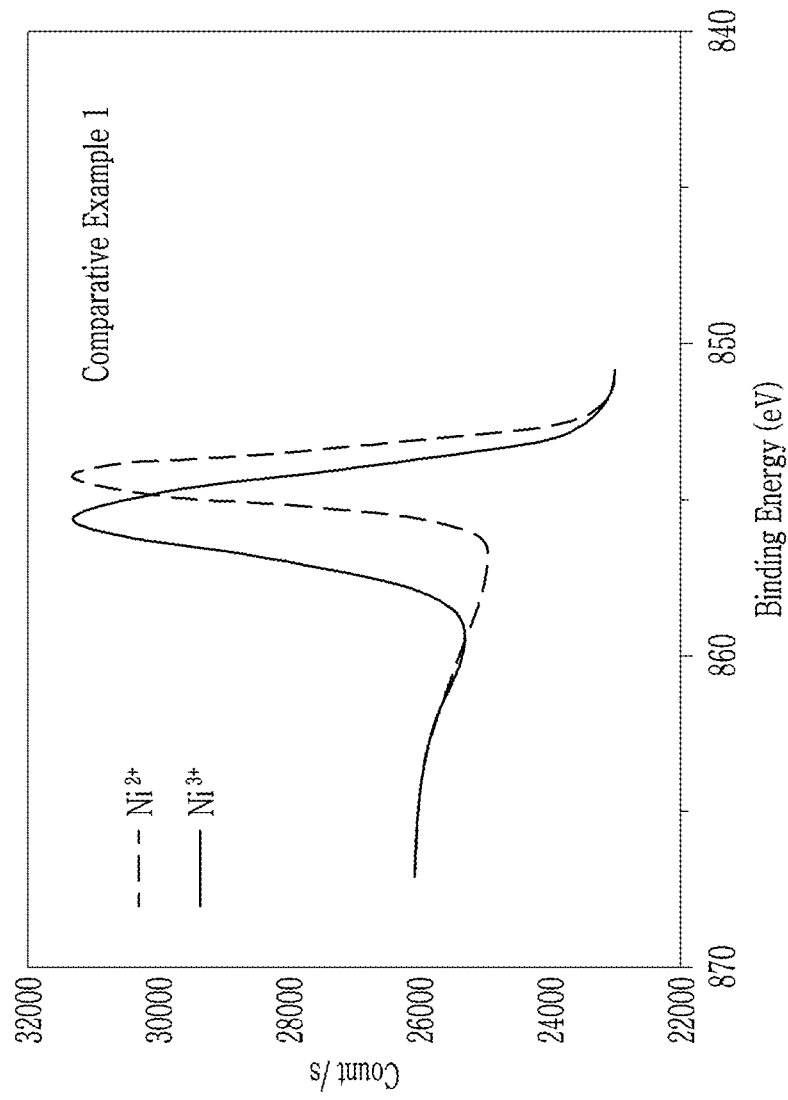
FIGS. 9D to 9F are graphs showing a Ni oxidation number, a Co oxidation number, and a Mn oxidation number of the positive active material according to Comparative Example 1, respectively.
Figure 9E:
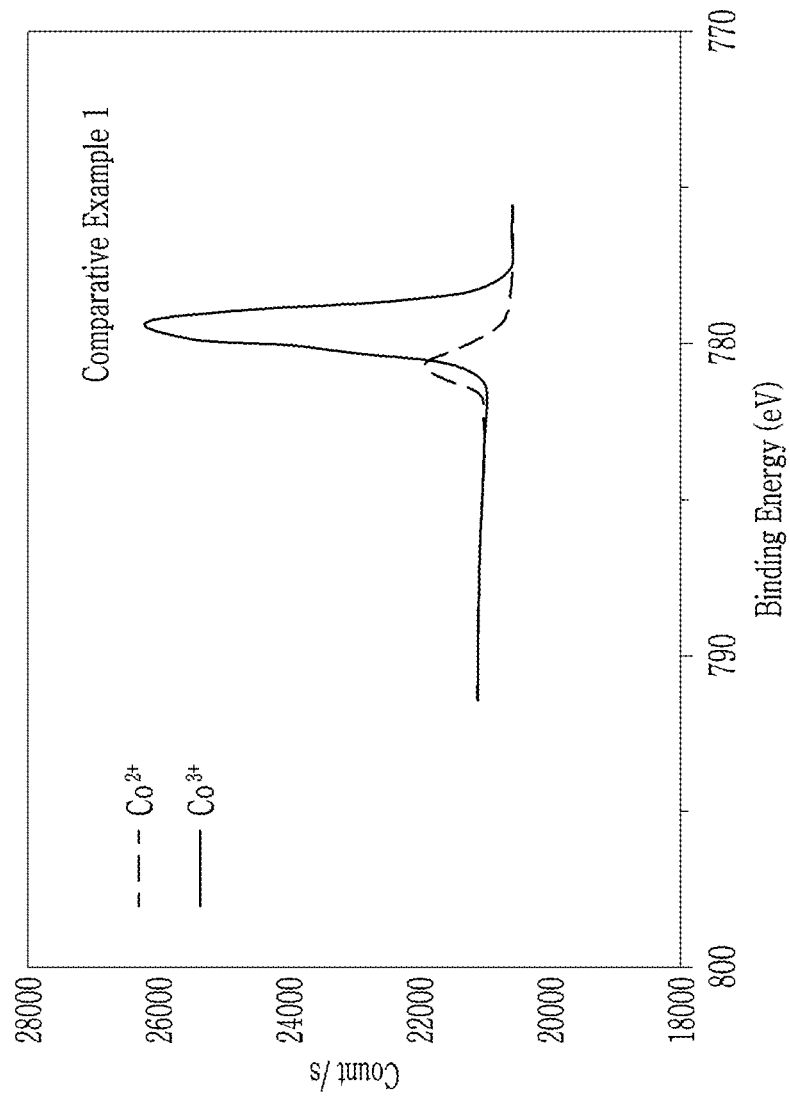
Figure 9F:
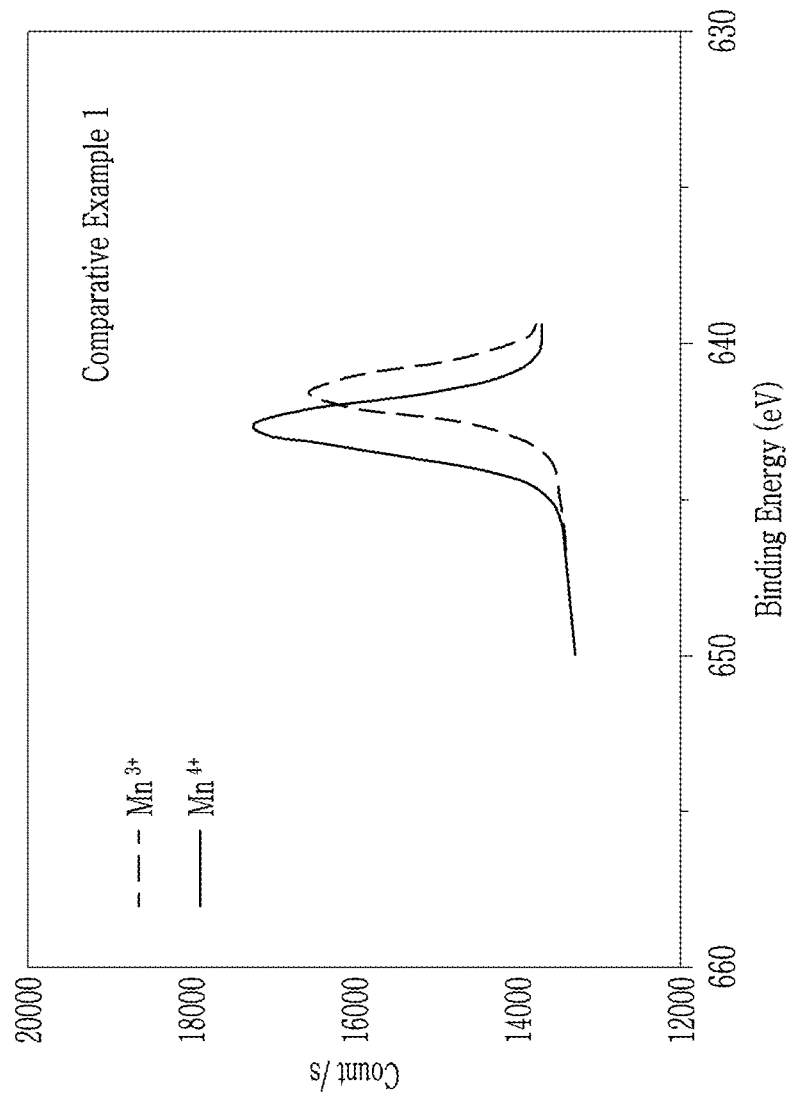

The measured and calculated results are shown in Table 4, FIGS. 9A to 9C are graphs sequentially showing the Ni oxidation number, the Co oxidation number, and the Mn oxidation number of Example 1, respectively, and FIGS. 9D to 9F are graphs sequentially showing the Ni oxidation number, the Co oxidation number, and the Mn oxidation number of Comparative Example 1, respectively.

TABLE 4

| | Ni | Peak area (count/s · eV) | Peak area ratio ($A_{Ni3+}$/$A_{Ni2+}$) | Mn | Peak area (count/s · eV) | Peak area ratio ($A_{Mn3+}$/$A_{Mn4+}$) | Co | Peak area (count/s · eV) | Peak area ratio ($A_{Co3+}$/$A_{Co2+}$) |
|---|---|---|---|---|---|---|---|---|---|
| Ex. 1 | $Ni^{3+}$ | 18765.58 | 1.61 | $Mn^{4+}$ | 23136.51 | 0.03 | $Co^{3+}$ | 9221.85 | 9.39 |
| | $Ni^{2+}$ | 11640.94 | | $Mn^{3+}$ | 663.52 | | $Co^{2+}$ | 982.56 | |
| Comp. Ex. 1 | $Ni^{3+}$ | 14828.12 | 0.70 | $Mn^{4+}$ | 21517.83 | 0.14 | $Co^{3+}$ | 7782.16 | 7.19 |
| | $Ni^{2+}$ | 21057.54 | | $Mn^{3+}$ | 3059.26 | | $Co^{2+}$ | 1082.67 | |

Referring to Table 4 and FIGS. 9A to 9F, $Ni^{3+}$, $Co^{3+}$, and $Mn^{4+}$ were present in relatively larger amounts on the surface of the positive active material of Example 1 than in Comparative Example 1.

Evaluation of Initial Capacity Characteristics

The half cells according to Example 1 and Comparative Example 1 at room temperature (25° C.) as the 1$^{st}$ cycle were constant current-charged up to a voltage of 4.3 V (vs. Li) at a 0.1 C rate, and subsequently cut off at a 0.05 C rate, while being maintained at 4.3 V in a constant voltage mode. Subsequently, the cells were constant current-discharged down to a voltage of 2.5 V (vs.Li) at a 0.1 C rate. The results according to the 1$^{st}$ cycle charge and discharge are shown in Table 5.

In addition, the 1$^{st}$ and 2$^{nd}$ charge and discharge cycles were performed in the same method as above, except that the 0.1 C rate was changed to a 0.2 C rate in the 1$^{st}$ cycle. The results are shown in Table 5.

The full cells of Example 1 and Comparative Example 1 were charged and discharged according to the same method as performed in the half cells except that the voltage was set in a range of 1.5 to 4.25 V, and then evaluated with respect to initial capacity characteristics, and the results are shown in Table 5.

TABLE 5

| Half cell | 0.1 C 1st cycle charge and discharge | | | 0.2 C 1st cycle charge and discharge | | | 0.2 C 2nd cycle charge and discharge | | |
|---|---|---|---|---|---|---|---|---|---|
| | Charge capacity (mAh/g) | Discharge capacity (mAh/g) | Efficiency (%) | Charge capacity (mAh/g) | Discharge capacity (mAh/g) | Efficiency (%) | Charge capacity (mAh/g) | Discharge capacity (mAh/g) | Efficiency (%) |
| Ex. 1 | 199.9 | 183.4 | 91.8 | 184.6 | 179.6 | 97.3 | 180.7 | 179.7 | 99.5 |
| Comp. Ex.1 | 200.3 | 178.5 | 89.1 | 180.0 | 175.0 | 97.2 | 176.3 | 175.3 | 99.4 |

| Full cell | 0.1 C 1st cycle charge and discharge | | | 0.2 C 1st cycle charge and discharge | | | 0.2 C 2nd cycle charge and discharge | | |
|---|---|---|---|---|---|---|---|---|---|
| | Charge capacity (mAh/g) | Discharge capacity (mAh/g) | Efficiency (%) | Charge capacity (mAh/g) | Discharge capacity (mAh/g) | Efficiency (%) | Charge capacity (mAh/g) | Discharge capacity (mAh/g) | Efficiency (%) |
| Ex. 1 | 2.533 | 1.719 | 67.8 | 1.730 | 1.646 | 95.1 | 1.650 | 1.623 | 98.4 |
| Comp. Ex. 1 | 2.526 | 1.717 | 67.9 | 1.731 | 1.635 | 94.5 | 1.640 | 1.609 | 98.1 |

Referring to Table 5, the half cell and the full cell of Example 1 exhibited excellent initial capacity characteristics and thus improved initial charge and discharge efficiency compared with those of Comparative Example 1.

High-Rate Charging and Discharging Characteristics

The half cells of Example 1 and Comparative Example 1 were charged and discharged at a 0.5 C rate within a voltage range of 2.5 to 4.3 V under a CV cut-off condition of 0.02 C (Reference Capacity 1 C=180 mAh/g) as the $1^{st}$ cycle at room temperature (25° C.), and charged sequentially at each 1 C/3 C/5 C/6 C rate and discharged at 0.5 C after the charges at each C rate, and then evaluated with respect to high-rate charging characteristics. In order to minimize an influence of each cycle during the charge current density increase, 0.5 C cycle charge/discharge was performed before and after each C-rate charge and discharge step. In addition, charge capacities when charged for 10 minutes at a 6 C rate under CC and CV modes. The results are shown in Tables 6 and 7.

The full cells according to Example 1 and Comparative Example 1 were charged and discharged the same as the half cells except that the voltage range was set within 1.5 to 4.25 V, and then evaluated with respect to high-rate charging and discharging characteristics, and the results are shown in Tables 6 and 7.

TABLE 6

| <Half cell> Ex. 1 | 1C | | | 3C | | | 5C | | | 6C | | |
|---|---|---|---|---|---|---|---|---|---|---|---|---|
| | CC | CV | Total | CC | CV | Total | CC | CV | Total | CC | CV | Total |
| (mAh/g) | 169.2 | 4.9 | 174.1 | 160.1 | 14.0 | 174.1 | 149.2 | 25.2 | 174.4 | 142.3 | 32.1 | 174.5 |
| (%) | 97.2 | 2.8 | 100 | 92.0 | 8.0 | 100 | 85.5 | 14.5 | 100 | 81.6 | 18.4 | 100 |

| <Half cell> Comp. Ex. 1 | 1C | | | 3C | | | 5C | | | 6C | | |
|---|---|---|---|---|---|---|---|---|---|---|---|---|
| | CC | CV | Total | CC | CV | Total | CC | CV | Total | CC | CV | Total |
| (mAh/g) | 164.5 | 5.8 | 170.3 | 154.2 | 16.4 | 170.6 | 141.9 | 29.0 | 170.9 | 134.2 | 37.2 | 171.4 |
| (%) | 96.6 | 3.4 | 100 | 90.4 | 9.6 | 100 | 83.0 | 17.0 | 100 | 78.3 | 21.7 | 100 |

| <Full cell> Ex. 1 | 1C | | | 3C | | | 5C | | | 6C | | |
|---|---|---|---|---|---|---|---|---|---|---|---|---|
| | CC | CV | Total | CC | CV | Total | CC | CV | Total | CC | CV | Total |
| (mAh) | 1.46 | 0.08 | 1.54 | 1.30 | 0.21 | 1.51 | 1.16 | 0.32 | 1.49 | 1.09 | 0.39 | 1.47 |
| (%) | 95.0 | 5.0 | 100 | 86.4 | 13.6 | 100 | 78.3 | 21.7 | 100 | 73.8 | 26.2 | 100 |

| <Full cell> Comp. Ex. 1 | 1C | | | 3C | | | 5C | | | 6C | | |
|---|---|---|---|---|---|---|---|---|---|---|---|---|
| | CC | CV | Total | CC | CV | Total | CC | CV | Total | CC | CV | Total |
| (mAh) | 1.46 | 0.10 | 1.56 | 1.29 | 0.24 | 1.52 | 1.14 | 0.35 | 1.50 | 1.05 | 0.43 | 1.48 |
| (%) | 93.4 | 6.6 | 100 | 84.6 | 15.4 | 100 | 76.4 | 23.6 | 100 | 70.8 | 29.2 | 100 |

From Table 6, in the high-rate charging characteristics, as the C rate of the half cell according to Example 1 increased (1C→6C), the CC charge capacity decrease width was small, and accordingly, the high total charge capacity compared is exhibited with the half cell according to Comparative Example 1. In addition, the full cell according to Example 1 has a small decrease in the CC charging capacity compared with the full cell according to Comparative Example 1.

Figure 11A:
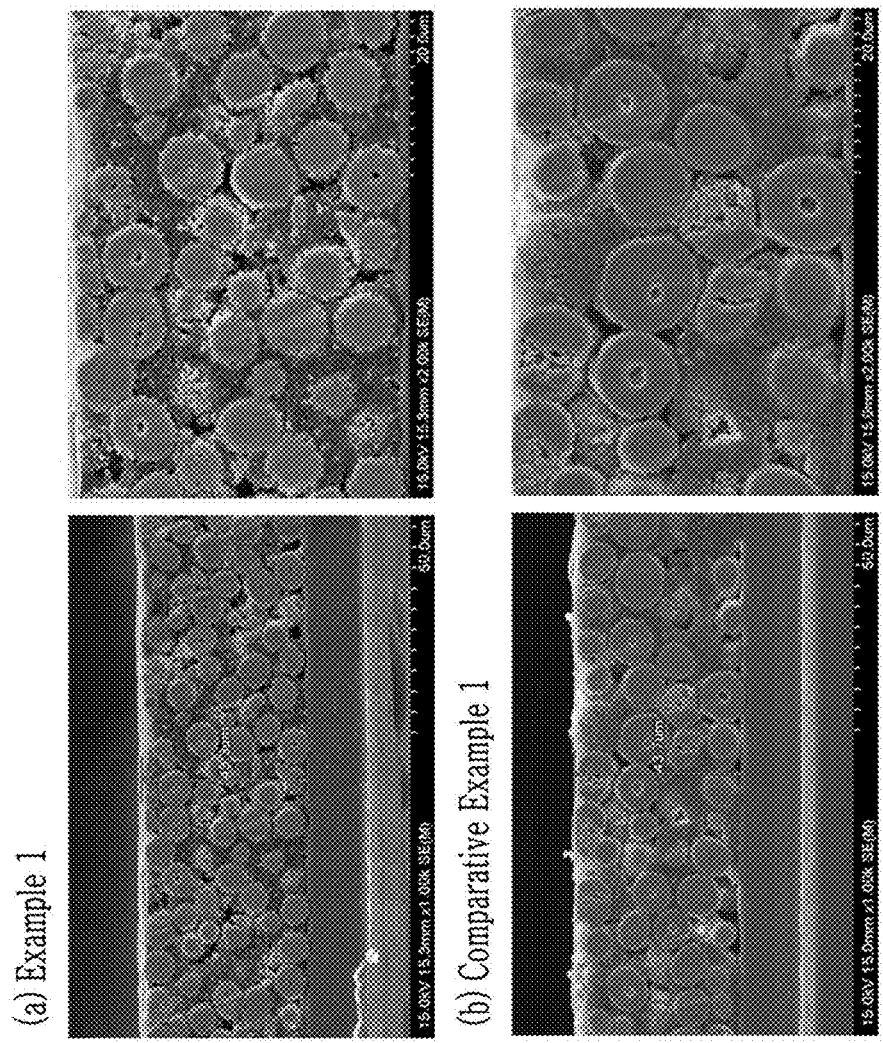
FIG. 11A shows cross-sectional SEM images of positive active material layers of the cells of Example 1 and Comparative Example 1 before high-rate charging and discharging.
Figure 11B:
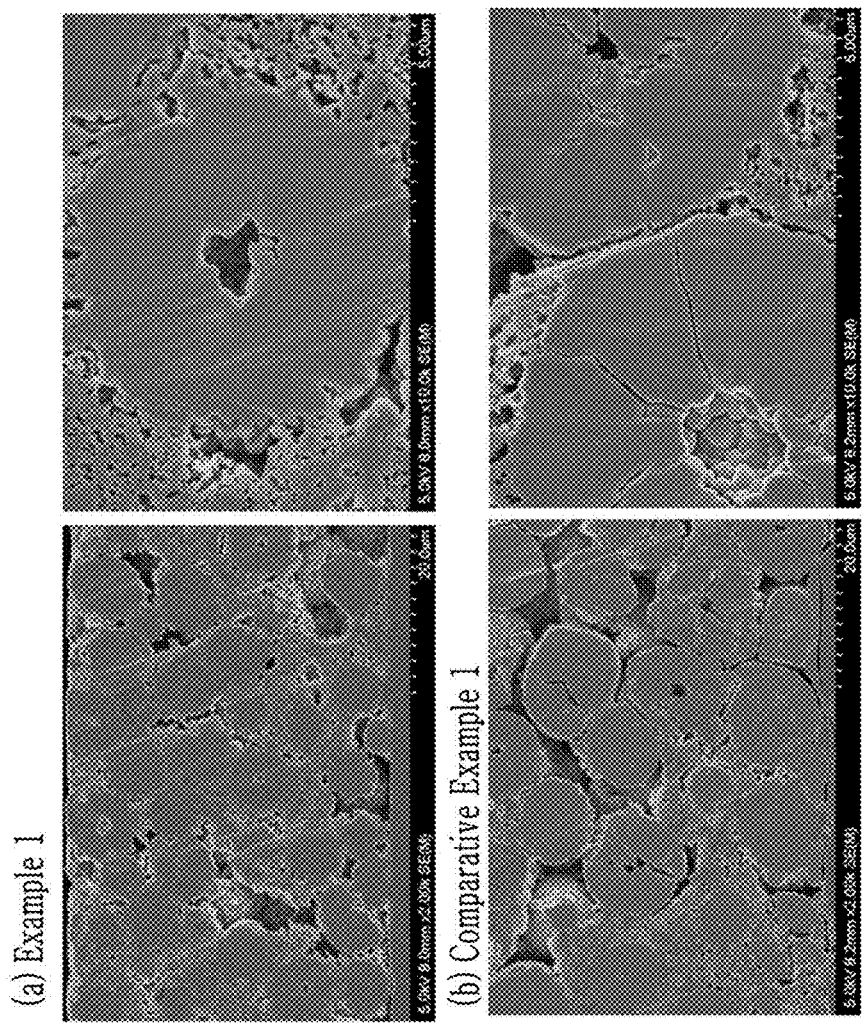
FIG. 11B shows cross-sectional SEM images of the positive active material layers of the cells of Example 1 and Comparative Example 1 after high-rate charging and discharging.

In addition, FIGS. 11A and 11B respectively show cross-sectional SEM images of positive active material layers before and after the high-rate charge and discharge of the cells of Example 1 and Comparative Example 1.

Referring to FIGS. 11A and 11B, the positive active material particles synthesized in Example 1 had no damage on protruding portions on the surface after the high-rate charge but maintained the same protruding portions as before the charge and discharge, but the positive active material of Comparative Example 1 exhibited particle cracks after the high-rate charge and discharge unlike that of Example 1.

TABLE 7

| | <Half cell> Example 1 | | | | | <Half cell> Comparative Example 1 | | | |
|---|---|---|---|---|---|---|---|---|---|
| | CC (mAh/g) | CV (mAh/g) | Total (mAh/g) | Charge rate (%) | | CC (mAh/g) | CV (mAh/g) | Total (mAh/g) | Charge rate (%) |
| 10 min | 97.2 | 2.8 | 100 | 94.2 | 10 min | 96.6 | 3.4 | 100 | 93.6 |

| | <Full cell> Example 1 | | | | | <Full cell> Comparative Example 1 | | | |
|---|---|---|---|---|---|---|---|---|---|
| | CC (mAh) | CV (mAh) | Total (mAh) | Charge rate (%) | | CC (mAh) | CV (mAh) | Total (mAh) | Charge rate (%) |
| 10 min | 1.087 | 0.324 | 1.411 | 95.7 | 10 min | 1.048 | 0.350 | 1.398 | 94.4 |

Referring to Table 7, both the half cell and the full cell of Example 1 exhibited improved total charge capacity and charge rate when charged for 10 minutes at a 6 C rate compared with those of Comparative Example 1.

Figure 10A:
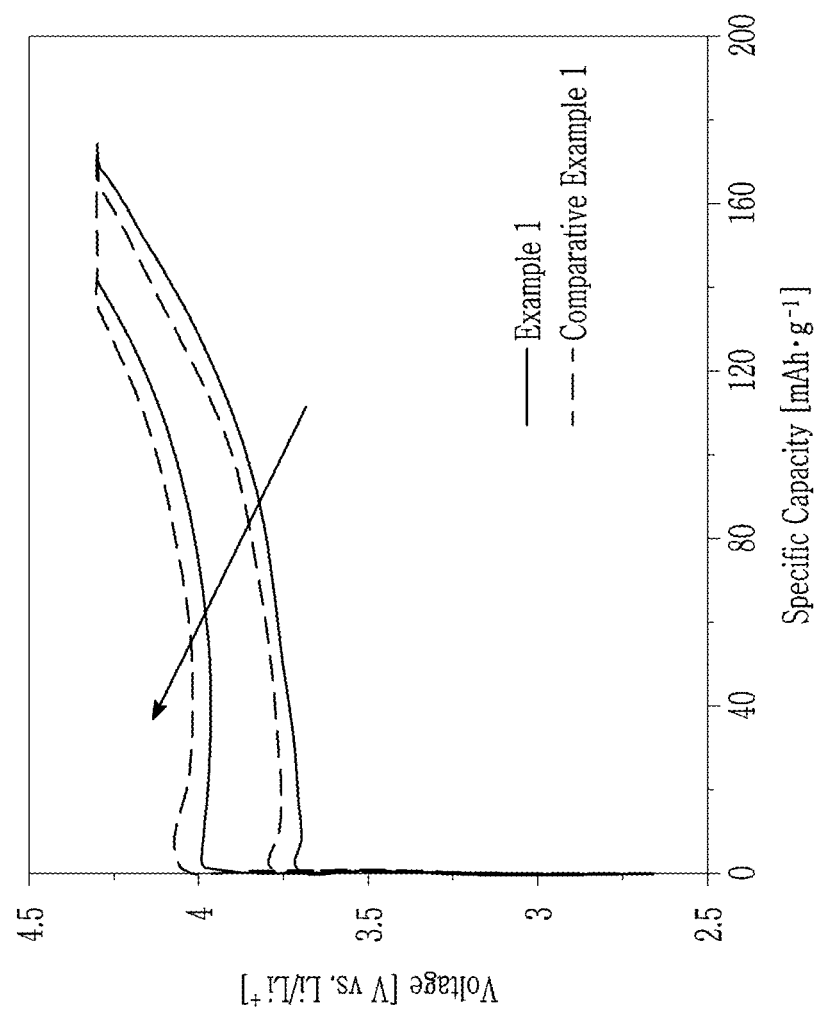
FIG. 10A is a graph showing the charge results at 1 C and 6 C of half cells according to Example 1 and Comparative Example 1.
Figure 10B:
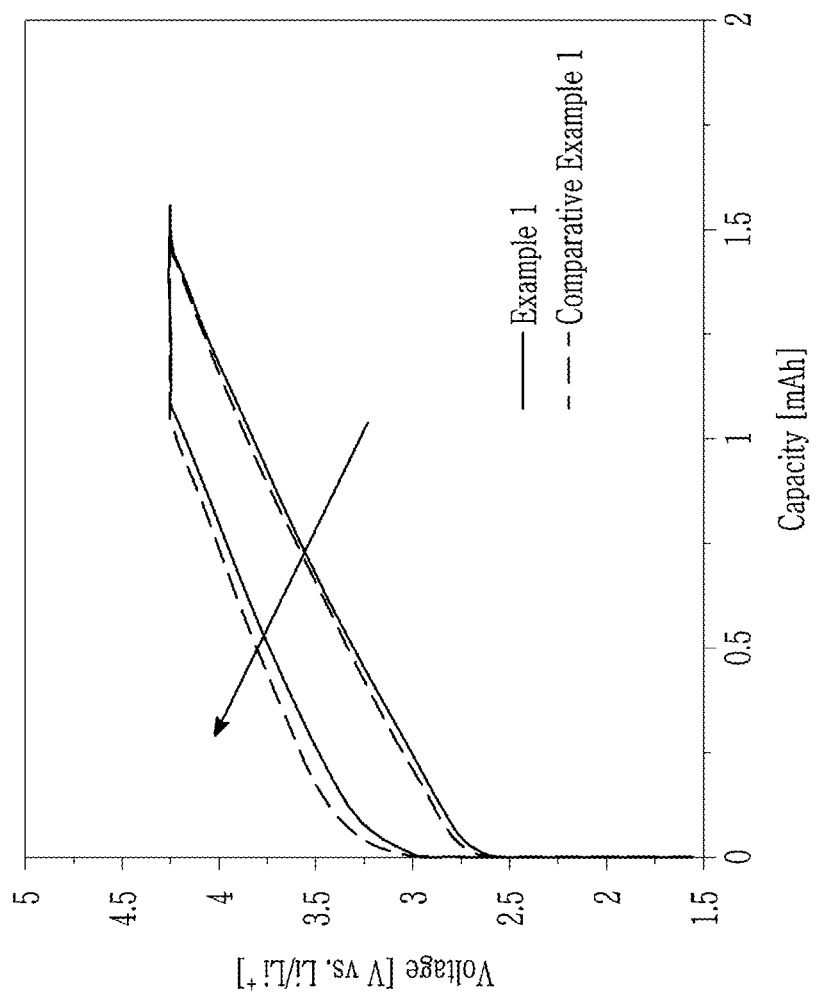
FIG. 10B is a graph showing the charge results at 1 C and 6 C of full cells according to Example 1 and Comparative Example 1.

In addition, the half cells and full cells according to Example 1 and Comparative Example 1 were charged with 1C, 3C, 5C, and 6C to measure the charge voltage. Table 8 shows charge voltages at 5 mAhg$^{-1}$ of the half cells according to Example 1 and Comparative Example 1 and charge voltages at 0.05 mAh of the full cells according to Example 1 and Comparative Example 1. The charging profiles of 1C and 6C of the half cells according to Example 1 and Comparative Example 1 are shown in FIG. 10A, and the charging profiles of 1C and 6C of the full cells according to Example 1 and Comparative Example 1 are shown in FIG. 10B. The arrows in FIGS. 10A and 10B indicate an increase in C-rate (1C→6C).

TABLE 8

| | | 1C | 3C | 5C | 6C |
|---|---|---|---|---|---|
| Half cell | Example 1 | 3.69 V | 3.82 V | 3.91 V | 3.93 V |
| | Comparative Example 1 | 3.86 V | 3.93 V | 4.04 V | 4.07 V |
| Full cell | Example 1 | 2.75 V | 2.88 V | 3.01 V | 3.07 V |
| | Comparative Example 1 | 2.76 V | 2.95 V | 3.14 V | 3.26 V |

Referring to Table 8 and FIGS. 10A and 10B, the half cell and the full cell of Comparative Example 1 exhibited over-potential (overvoltage) compared with those of Example 1. Particularly, FIG. 10B shows that the full cells of Example 1 and Comparative Example 1 were charged at 1 C within a similar voltage range, but when charged at 6 C, the full cell of Example 1 was charged at a lower voltage than that of Comparative Example 1, and accordingly, the rechargeable lithium battery cell according to one embodiment exhibited much improved high-rate charge characteristics.

Evaluation of Room Temperature and High Temperature Cycle-Life Characteristics

The half cells of Example 1 and Comparative Example 1 were CC/CV charged at a 6.0 C rate within a voltage range of 1.5 to 4.25 V with reference capacity of 1 C=180 mAh/g under a cut-off condition of 0.02 C and CC discharged at a 1 C rate at room temperature (25° C.), which was regarded as one cycle. This charge and discharge cycle was performed 50 times in total, and discharge capacity at the 50$^{th}$ cycle relative to discharge capacity at the 1$^{st}$ cycle was calculated to obtain capacity retention. The results are shown in Table 9.

The full cells of Example 1 and Comparative Example 1 were CC/CV charged at the 6.0 C rate within the voltage range or at 4.3 V with reference capacity of 1 C=180 mAh/g under a cut-off condition of 0.02 C and CC discharged at a 1 C at 25° C., which was regarded as 1 cycle. This charge and discharge cycle was repeated 700 times in total, and discharge capacity at the 700$^{th}$ cycle relative to discharge capacity at the 1$^{st}$ cycle was calculated to obtain capacity retention. The results are shown in Table 9.

TABLE 9

| <Half cell> | Cycle number (No) | Discharge capacity (mAh/g) | Capacity retention (%) |
|---|---|---|---|
| Example 1 | 1 | 166.2 | 100 |
| | 50 | 102.8 | 61.9 |
| Comparative Example 1 | 1 | 163.5 | 100 |
| | 50 | 70.6 | 43.2 |

| <Full cell> | cycle number (No) | Discharge capacity (mAh) | Capacity retention (%) |
|---|---|---|---|
| Example 1 | 1 | 1.20 | 100.0 |
| | 1000 | 1.10 | 91.6 |
| Comparative Example 1 | 1 | 1.16 | 100.0 |
| | 1000 | 1.03 | 88.7 |

Referring to Table 9, the half cell and the full cell of Example 1 respectively exhibited improved room temperature cycle-life characteristics compared with those of Comparative Example 1.

Figure 12:
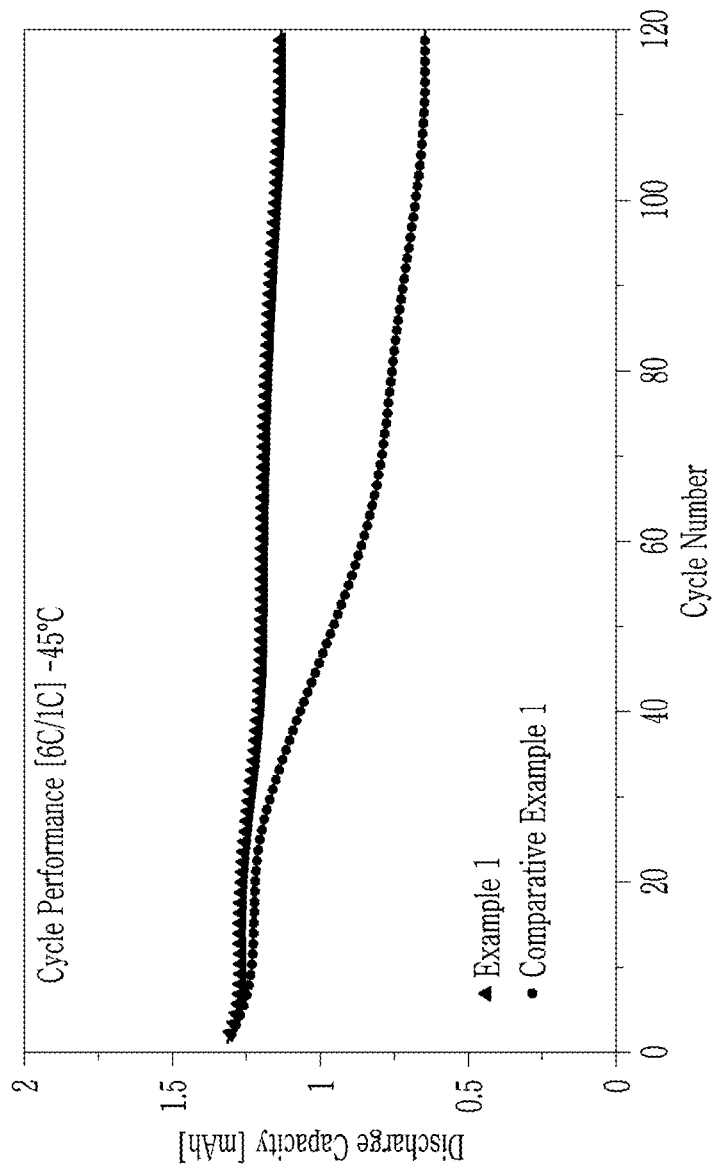
FIG. 12 is a graph showing high-temperature cycle-life characteristics of the full cells according to Example 1 and Comparative Example 1.

The full cells of Example 1 and Comparative Example 1 were CC/CV charged at a 6.0 C rate within a voltage range of 2.5 V to 4.3 V with reference capacity of 1 C=180 mAh/g under a cut-off condition of 0.02 C and CC discharged at a 1 C rate at 45° C., which was regarded as one cycle. This charge and discharge cycle was performed 120 times in total, and discharge capacity at the 50$^{th}$ cycle relative to discharge capacity at the 1$^{st}$ cycle was calculated to obtain capacity retention. The results are shown in FIG. 12 and Table 10. FIG. 12 is a graph showing high-temperature cycle-life characteristics of the full cells according to Example 1 and Comparative Example 1.

TABLE 10

|  | Cycle number (No.) | Discharge capacity (mAh) | Capacity retention (%) |
|---|---|---|---|
| Example 1 | 1 | 1.32 | 100 |
|  | 120 | 1.13 | 85.8 |
| Comparative Example 1 | 1 | 1.32 | 100 |
|  | 120 | 0.64 | 48.3 |

Referring to FIG. 12 and Table 10, the full cell according to Example 1 showed improved high-temperature cycle-life characteristics compared with Comparative Example 1.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: secondary particles of the nickel-based transition metal oxide
3: inner portion of secondary particle of the nickel-based transition metal oxide
5: outer portion of secondary particles of the nickel-based transition metal oxide
7: protruding portion of secondary particles of the nickel-based transition metal oxide

| 31: rechargeable lithium battery | 32: negative electrode |
|---|---|
| 33: positive electrode | 34: separator |
| 35: battery case | 36: cap assembly |

What is claimed is:

1. A positive active material for a rechargeable lithium battery, comprising
   secondary particles of a nickel-based transition metal oxide composed of an inner portion and an outer portion,
   wherein the inner portion has a dense structure having a higher density than the outer portion,
   the secondary particles of the nickel-based transition metal oxide have a plurality of protruding portions on the surface thereof, and
   the positive active material has an area ratio of 25% to 30% occupied by protrusions calculated by Equation 1 based on a cross-section of the secondary particles of the nickel-based transition metal oxide:

$$[A_t - A_i]/A_t \quad \text{[Equation 1]}$$

wherein, in Equation 1,
   $A_t$ is a total area of the secondary particle of the nickel-based transition metal oxide, and
   $A_i$ is an area of an inner circle with a radius from the inner end of a vertically oriented primary particle constituting each of the protruding portions to the center of the secondary particle of the nickel-based transition metal oxide,
   wherein the primary particle constituting each of the protruding portions have a concentration gradient in which a fraction of cobalt (Co) decreases from an outer end portion to an inner end portion of each of the protruding portions,
   wherein when a length of a narrowest portion of each of the protruding portions is a width (W) and a length from an outer end portion of each of the protruding portions to the inner circle is a height (H),
   the width (W) is 0.25 μm to 0.60 μm, and
   the height (H) is 0.65 μm to 1.00 μm.

2. The positive active material of claim 1, wherein when a length of a narrowest portion of the protruding portion is a width (W) and a length from an outer end portion of the protruding portion to the inner circle is a height (H), an aspect ratio is 1.4 to 2.8.

3. The positive active material of claim 1, wherein when in the primary particle constituting each of the protruding portions, a region from 20% of the major axis or minor axis of the primary particle from an outer end portion of the primary particle to 40% of the major axis or minor axis of the primary particle from the outer end portion of the primary particle is referred to as an outer region and a region from 20% of the major axis or minor axis from an inner end portion of the primary particle to 40% of the major axis or minor axis from the inner end portion of the primary particle is referred to as an inner region, the fraction of cobalt in the outer region is 27 at % to 30 at % relative to 100 at % of transition metals and the fraction of cobalt in the inner region is 12 at % to 23 at % relative to 100 at % of transition metals.

4. The positive active material of claim 1, wherein the ratio ($F_2/F_1$) of the fraction ($F_2$) of the cobalt in an inner region to the fraction ($F_1$) of the cobalt in an outer region is in the range of 0.60 to 0.90.

5. The positive active material of claim 1, wherein
   the secondary particles of the nickel-based transition metal oxide have an average particle diameter (D50) of 8 μm to 11 μm,
   the inner portion has a size (diameter) of 6 μm to 9 μm, and
   the outer portion has a thickness of 0.5 μm to 1.0 μm.

6. The positive active material of claim 1, wherein when XPS analyzing the surface of the positive active material, a ratio ($A_{Ni3+}/A_{Ni2+}$) of a peak area ($A_{Ni3+}$) of $Ni^{3+}$ relative to a peak area ($A_{Ni2+}$) of $Ni^{2+}$ is greater than or equal to 0.75.

7. The positive active material of claim 1, wherein when XPS analyzing the surface of the positive active material, a ratio ($A_{Co3+}/A_{Co2+}$) of a peak area ($A_{Co3+}$) of $Co^{3+}$ relative to a peak area ($A_{Co2+}$) of $Co^{2+}$ is greater than or equal to 7.5.

8. The positive active material of claim 1, wherein when XPS analyzing the surface of the positive active material, a ratio ($A_{Mn3+}/A_{Mn4+}$) of a peak area ($A_{Mn3+}$) of $Mn^{3+}$ relative to a peak area ($A_{Mn4+}$) of $Mn^{4+}$ is less than or equal to 0.10.

9. The positive active material of claim 1, wherein a fraction of at least one transition metal based on 100 at % (atomic percent) of the transition metal has a difference of greater than or equal to 20 at % between the inner portion and the outer portion.

10. The positive active material of claim 1, wherein the positive active material has a composition in which a fraction of nickel of the inner portion based on 100 at % of the transition metal is 50 at % or more higher than that of nickel of the outer portion based on 100 at % of the transition metal.

11. The positive active material of claim 1, wherein the positive active material has a composition in which a fraction of cobalt of the outer portion based on 100 at % of the transition metal is 30 at % or more higher than that of cobalt of the inner portion based on 100 at % of the transition metal.

12. The positive active material of claim 1, wherein the secondary particles of the nickel-based transition metal oxide is a compound represented by Chemical Formula 1:

$$Li_aNi_xCo_yM_{1-x-y}O_2 \qquad \text{[Chemical Formula 1]}$$

wherein, in Chemical Formula 1,
$0.9 \leq a \leq 1.05$, $0.55 \leq x \leq 0.95$, $0.05 \leq y \leq 0.35$, and M is at least one metal element selected from Mn, Al, Cr, Fe, V, Mg, Ti, Zr, Nb, Mo, W, Cu, Zn, Ga, In, Sn, La, and Ce.

13. The positive active material of claim 1, wherein the positive active material has a specific surface area of 0.3 $m^2/g$ to 0.6 $m^2/g$.

14. A method of preparing the positive active material for a rechargeable lithium battery of claim 1, comprising:
introducing a metal solution for forming a core including a transition metal compound represented by Chemical Formula 2, a chelating agent, and a precipitating agent into a reactor to prepare a precursor core by co-precipitation;

adding a metal solution for forming a shell including a transition metal compound represented by Chemical Formula 3 to prepare a precursor shell on the precursor core by co-precipitation followed by filtering, washing, and drying the produced material to prepare the secondary particle of the nickel-based transition metal hydroxide of claim 10; and mixing the secondary particle of the nickel-based transition metal hydroxide and a lithium salt to continuously perform a first heat treatment and a second heat treatment to prepare a secondary particle of the nickel-based transition metal oxide:

$$Ni_xCo_yM_{1-x-y}(SO)_4 \qquad \text{[Chemical Formula 2]}$$

wherein, in Chemical Formula 2,
$0.70 \leq x$, $y \leq 0.30$, and M is at least one metal element selected from Mn, Al, Cr, Fe, V, Mg, Ti, Zr, Nb, Mo, W, Cu, Zn, Ga, In, Sn, La, and Ce;

$$Ni_xCo_yM_{1-x-y}(SO)_4 \qquad \text{[Chemical Formula 3]}$$

wherein, in Chemical Formula 3,
$0.05 \leq x \leq 0.45$, $0.50 \leq y \leq 0.80$, and M is at least one metal element selected from Mn, Al, Cr, Fe, V, Mg, Ti, Zr, Nb, Mo, W, Cu, Zn, Ga, In, Sn, La, and Ce.

15. The method of claim 14, wherein the first heat treatment is performed in an oxygen atmosphere at 450° C. to 650° C. for 5 hours to 10 hours, and
the second heat treatment is performed in an oxygen atmosphere at 700° C. to 1000° C. for 10 hours to 20 hours.

16. A rechargeable lithium battery comprising
a positive electrode including the positive active material of claim 1;
a negative electrode; and
an electrolyte.

* * * * *